United States Patent
George et al.

(10) Patent No.: US 9,280,782 B1
(45) Date of Patent: Mar. 8, 2016

(54) DEAL BASED COMMUNICATIONS VIA MULTIPLE CHANNEL OPTIONS

(75) Inventors: Michael M. George, Mercer Island, WA (US); Aditya Balwant Pande, Seattle, WA (US); Gustavo E. Lopez, Seattle, WA (US)

(73) Assignee: Amazon Technolgies, Inc., Seattle, WA (US)

( * ) Notice: Subject to any disclaimer, the term of this patent is extended or adjusted under 35 U.S.C. 154(b) by 895 days.

(21) Appl. No.: 13/214,045

(22) Filed: Aug. 19, 2011

(51) Int. Cl.
*G06Q 30/02* (2012.01)

(52) U.S. Cl.
CPC ........ *G06Q 30/0215* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 6,269,343 B1 | 7/2001 | Pallakoff | |
| 6,996,579 B2 * | 2/2006 | Leung | G06Q 30/02 |
| 7,668,747 B2 | 2/2010 | Murphy et al. | |
| 7,672,897 B2 | 3/2010 | Chung et al. | |
| 8,676,642 B1 * | 3/2014 | Sheley | G06Q 30/0234 705/14.24 |
| 2010/0114683 A1 * | 5/2010 | Wessels et al. | 705/14.13 |
| 2011/0301986 A1 * | 12/2011 | Pappas et al. | 705/6 |
| 2012/0221389 A1 * | 8/2012 | Sharma et al. | 705/14.17 |

* cited by examiner

*Primary Examiner* — Jamie Kucab
(74) *Attorney, Agent, or Firm* — Lee & Hayes, PLLC

(57) ABSTRACT

Architectures and techniques are described to provide a number of options to exchange information related to deals via a plurality of channels. Each of the communication channels may be utilized to exchange communications about different aspects of acquiring and redeeming deals. The channel options may be related to categories of computing devices, operating systems executed by computing devices, one or more sites, various forms of communication, client device applications, etc. A service provider that offers deals on behalf of merchants may determine one or more options for each communication channel with respect to merchants offering deals and with respect individuals that may participate in deals offered by the service provider. After determining the channel options for a deal offered by a particular merchant and for individuals designated to receive information about the deal, communications with respect to the deal may be exchanged over the channels via certain channel options.

30 Claims, 10 Drawing Sheets

DEAL BASED COMMUNICATIONS VIA MULTIPLE CHANNEL OPTIONS

BACKGROUND

Many merchants offer deals to individuals to increase the acquisition of the items by consumers from the merchants. In many cases, information related to deals may be exchanged between the consumers, the merchants, service providers, third-parties, or combinations thereof. For example, individuals may receive information about deals from merchants, service providers, deal sourcers, and the like. Additionally, input options to acquire deals and information about transactions to acquire deals may be exchanged between entities associated with offering deals and the individuals acquiring the deals. Further, transactions may be conducted relating to the redemption of deals, the refunding of the value of deals, and/or the refunding of the value of items acquired in association with the deals.

Typically, information may be exchanged in association with the advertising, acquisition, redemption, and return/refund of deals via a limited number of options. To illustrate, an individual may receive information about a deal via a mobile client device, acquire the deal via the mobile client device, and redeem the deal via the mobile client device. In another illustration, an individual may receive information about a deal via a site of a service provider, acquire the deal via the site of the service provider, and redeem the deal via the site of the service provider. Providing limited options to obtain information about deals, acquire deals, redeem deals, obtain refunds/returns in association with deals, and so forth, may be inconvenient and limit participation in deals by individuals and/or merchants.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
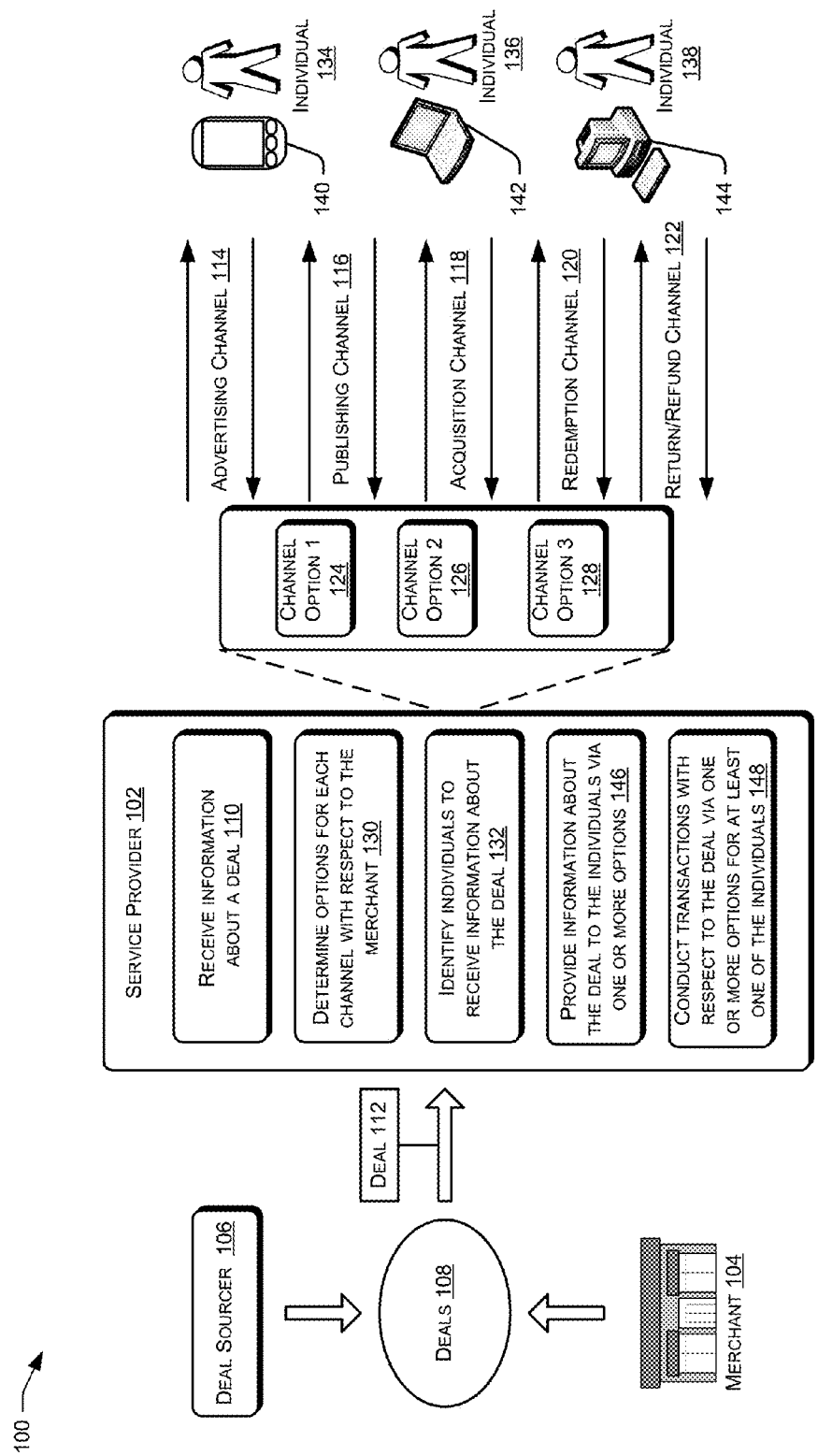
FIG. 1 illustrates an architecture to manage communications related to deals via a number of channels and provide a number of options for communication via each channel.

This disclosure describes architectures and techniques to provide an extensible platform including a number of options to exchange information related to deals via a plurality of channels. The information about the deals may be exchanged between a service provider, merchants, individuals, deal sourcers, third parties, or combinations thereof. Each of the communication channels may be utilized to exchange communications about different aspects of acquiring and redeeming deals. For example, the plurality of channels may include an advertising channel that provides information to individuals about deals. In another example, the plurality of channels may include a publishing channel that provides input options that are selectable to initiate transactions to acquire deals. Additionally, the plurality of channels may include an acquisition channel that is utilized to exchange communications directed to transactions to acquire deals. Further, the plurality of channels may include a redemption channel that is utilized to exchange communications directed to the acquisition of items in association with deals including the sending and receiving of redemption information, such as redemption codes. The plurality of channels may also include a return/refund channel that manages communications associated with the return of items acquired in association with deals and the refund of the price of certain deals.

Communications may be exchanged between the service provider, merchants, individuals, and other entities via a number of options with respect to each channel. In some cases, the channel options may be related to categories of computing devices (e.g. smart phones, laptop computers, electronic reader devices, etc.), operating systems executed by computing devices (e.g. Android®, iOS®, Windows®, etc.), one or more sites (e.g. merchant sites, social networking sites, micro-blogging sites, content sharing sites, etc.), one or more forms of communication (e.g. emails, messages, phone calls, etc.), client device applications, combinations thereof, and so forth.

In some cases, a service provider that offers deals on behalf of merchants may determine one or more options for each communication channel with respect to the merchants. For example, the service provider may determine that information communicated on an advertising channel about deals for a particular merchant will be provided via a site of the particular merchant and via a mobile device application. The service provider may also determine that information communicated on an acquisition channel about deals of the particular merchant will take place via a deals site maintained by the service provider. The channel options determined by the service provider with respect to the particular merchant may be based at least partly on information associated with the merchant, such as performance of previous deals of the particular merchant, ratings of the particular merchant, preferences of the particular merchant, capabilities of computing devices of the particular merchant, and so forth.

In addition, the service provider may determine options with respect to at least one channel for individuals that may participate in deals offered by the service provider. The channel options associated with each particular individual may depend, at least in part, on item and/or deal acquisition history of the individuals, preferences of the individuals, location of the individuals, previous usage of channel options by the individuals, capabilities of computing devices of the individuals, and the like.

After determining options for at least a portion of the channels for merchants offering deals and individuals that may receive information about the deals, communications with respect to the deals may be exchanged over the channels via certain channel options. In an illustrative implementation, a particular merchant may offer a deal and the service provider may identify a target audience for the deal. The service provider may provide information to the members of the target audience via the advertising channel using one or more channel options. The service provider may have determined that information for the particular deal will be provided to a target audience for the deal based on certain information associated with the merchant, certain information associated with the individuals, or both. Communications may also be exchanged between the service provider and individuals included in the target audience with respect to acquiring the deal via one or more options determined by the service provider for the acquisition channel. When an individual acquires items in association with the deal, the service provider may exchange communications with individuals of the target audience, merchants, or both, via one or more channel options determined by the service provider in association with the redemption channel.

By providing a number of options for information about deals to be exchanged on multiple channels, a service provider may increase the convenience for individuals to acquire and redeem deals. In addition, the service provider may increase the number of individuals receiving information about deals offered by the service provider on behalf of merchants when a number of options are available for information exchange with respect to certain channels. Thus, the number of deals acquired from the service provider may increase, which leads to increased revenue for the merchant, the service provider, other entities involved in offering deals on behalf of merchants, or combinations thereof. Additionally, by providing an extensible platform configured to add one or more channels and/or channel options, the service provider may increase the number of merchants offering deals via the service provider and also increase the number of individuals acquiring deals and redeeming deals via the service provider.

Example Architecture

FIG. 1 illustrates an architecture 100 to manage communications related to deals via a number of channels and provide a number of options for communication via each channel. The architecture 100 includes a service provider 102 that may offer deals on behalf of merchants, such as merchant 104, that may be acquired by one or more individuals. The deals described herein may represent some form of value to be applied when items are acquired by individuals in association with the deals, such as a discount, a credit, a rebate, and the like. In certain situations, the deals may be associated with one or more options that are selectable by individuals and that relate to specified items. In some cases, the items and/or terms associated with one option may be different from the items and/or terms of another option. The deals may also include promotions offered with respect to certain items, certain merchants, or both. In some instances, the deals may be provided upon a particular condition being satisfied, such as the acquisition of one or more items, the acquisition of one or more deals, and so on. In an illustrative example, an individual may acquire a deal and/or item and on a Thank You page of an order pipeline or in a confirmation notification provided after the deal and/or item has been acquired, the individual may be offered an additional deal and/or item. In some cases, the additional deal and/or item may be acquired when the individual provides value for the additional deal and/or item, while in other cases, the additional deal and/or item may be complementary. Further, in certain scenarios, a service provider, merchant, deal sourcer, or a combination thereof, may upon acquisition of the additional deal and/or item by the individual change conditions/terms associated with the initial deal. To illustrate, the service provider, merchant, and/or deal sourcer may restrict refunds on the initial deal and/or item.

The items offered in association with the deals described herein may include tangible items, intangible items, products, goods, services, a bundle of items, digital goods, digital services, and the like. The items offered by the merchant 104 may be acquired by individuals via one or more physical locations, via one or more sites (e.g. a site of the merchant, an online retailer site, etc.), or combinations thereof. The merchant 104 may also provide items acquired by individuals to locations specified by the individuals, such as via mobile services, delivery, etc. In addition, the acquisition of items from the merchant 104 by individuals may be achieved through various means of providing value for the items, such as purchasing items, renting items, borrowing items, trading items, bartering items, etc.

The architecture 100 also includes a deal sourcer 106 that aggregates deals from a number of merchants. In some situations, the merchants providing deals to the deal sourcer 106 may include the merchant 104. Deals 108 may be offered by the service provider 102 on behalf of the merchants associated with the deals 108 and/or on behalf of the deal sourcer 106. For example, in certain situations, the deal sourcer 106 may partner with the service provider 102 to offer deals on behalf of merchants. The merchant 104 and the deal sourcer 106 may include one or more computing devices that facilitate operations with respect to exchanging communications related to deals. In certain scenarios, the service provider 102 may be an online merchant that offers deals associated with items provided by the service provider 102.

In an illustrative implementation, at 110, the service provider 102 may receive information about a deal 112. The service provider 102 may receive the information about the deal 112 from the merchant 104, the deal sourcer 106, or both. The deal 112 may be related to one or more items offered by the merchant 104. The information received by the service provider 102 about the deal 112 may include terms of the deal 112. The terms of the deal 112 may include a discount associated with the deal 112, a credit associated with the deal 112, items offered in association with the deal 112, a time period to acquire the deal 112, one or more locations to redeem the deal 112, a time period to redeem the deal 112, a minimum number of individuals to participate in the deal 112, a maximum number of individuals to participate in the deal 112, a minimum value of items acquired in association with the deal 112, a maximum value of items acquired in association with the deal 112, combinations thereof, and the like. The information about the deal 112 received by the service provider 102 may also include characteristics of individuals that the merchant 104 and/or the deal sourcer 106 may target for the deal 112. For example, the deal information may indicate a preference to offer the deal 112 to individuals that have a particular item acquisition history, that have previously acquired deals offered by the merchant 104, that have certain demographic characteristics, and so on.

The architecture 100 includes a number of channels 114-122 for exchanging communications related to deals. The channels 114-122 represent certain information that is conveyed via the respective channels. In some cases, the information communicated via the channels 114-122 may be conveyed via one or more user interfaces displayed via client devices of individuals receiving the information. The information itself may be communicated via one or more networks, such as local networks, wide area networks, wired networks, wireless networks, combinations thereof, and so forth.

In a particular implementation, the advertising channel 114 is directed to communications associated with providing information about deals to individuals to encourage the individuals to acquire the deals. For example, advertising and/or promotional information indicating terms of deals, information about one or more items offered in association with deals, information about one or more merchants offering deals, combinations thereof, and the like, may be provided to individuals via the advertising channel. Additionally, the publishing channel 116 may be directed to communications associated with offering deals for acquisition. To illustrate, the publishing channel 116 may provide information related to acquiring deals, such as terms of the deals, information about items offered in association with deals, information about merchants offering the deals, input options selectable to acquire the deals (e.g. "Buy Now" button, "Add to Cart" button, etc.), combinations thereof, and the like. In certain cases, the publishing channel 116 can convey information similar to the information provided via the advertising channel 114. In addition, information provided via the publishing channel 116 may be provided in response to selection of an input option or link to receive additional information about deals that is provided via the advertising channel 114.

Further, the architecture 100 includes an acquisition channel 118 that is directed to exchanging communications related to acquiring deals. In certain instances, information may be exchanged via the acquisition channel 118 in response to selection of an input option to acquire a deal that is provided via the publishing channel 116. The information exchanged via the acquisition channel 118 may include an order pipeline where information utilized to conduct a transaction to acquire the deal is provided, such as payment instrument information, account information, and so forth. The acquisition channel 118 may also be utilized by the service provider 102 to provide information related to confirmation of the acquisition of deals and redemption information associated with the deals, such as vouchers, redemption codes, etc.

The architecture 100 may also include a redemption channel 120 that is directed to exchanging communications related to the acquisition of items in association with deals. In some instances, the information exchanged via the redemption channel 120 may be between individuals acquiring items in association with deals, the service provider 102, merchants offering the deals, third parties (e.g. financial institutions, payment instrument entities, payment services entities, etc.), or combinations thereof. The information exchanged via the redemption channel 120 may include requests to acquire items in association with deals, redemption codes associated with the deals, other information related to transactions to acquire items (e.g. payment instrument information, item delivery information, item pick-up information, etc.), combinations thereof, and the like.

In addition, the architecture 100 includes a return/refund channel 122 that is directed to exchanging communications related to the return of items acquired in association with deals, the return of deals acquired from the service provider 102, the refund of value for items returned that were acquired in association with deals, the refund of value for deals returned, or combinations thereof. In certain situations, the information exchanged via the return/refund channel 122 may be between individuals acquiring items in association with deals, the service provider 102, merchants offering the deals, third parties (e.g. financial institutions, payment instrument entities, payment services entities, etc.), or combinations thereof. For example, the communications exchanged via the return/refund channel 122 may be associated with providing value to an account of individuals returning items and/or deals, conveying an updated value of a particular deal, and the like.

The architecture 100 may include one or more channel options, such as channel options 124-128. The channel options 124-128 may represent various means to communicate information via the channels 114-122. In certain instances, each of the channels 114-122 may be associated with one or more of the channel options 124-128. The channel options 124-128 may include categories of computing devices, such as smart phones, mobile handsets, laptop computers, tablet computers, electronic reader devices, desktop computers, combinations thereof, and the like. The channel options 124-128 may also include operating systems executed by computing devices, such as Android®, iOS®, Windows®, etc. Further, the channel options 124-128 may include a site of a merchant offering a deal, a site of the service provider 102, a site of the deal sourcer 106, a deals site, an online retailer site, a content sharing site, a social networking site, a micro-blogging site, search engine sites, combinations thereof, and so on. In addition, the channel options 124-128 may include one or more forms of communication, such as email, messages (e.g. text message, image message, video message, audio message, etc.), voice calls, video calls, interactive voice response (IVR) calls, voice mails, combinations thereof, and so on. In some cases, the channel options 124-128 may include one or more client device applications (e.g. mobile device apps), one or more web-based applications, one or more application programming interfaces (APIs), combinations thereof, and the like.

In some situations, one or more of the channel options 124-128 may be configured to operate in an online mode, while one or more additional channel options 124-128 may be configured to operate in an offline mode. For example, the channel option 124 may be utilized by individuals to acquire deals and/or acquire items in association with the deals from the service provider 102 when respective client devices of the individuals are coupled to a network, such as a local area network, a wide area network, and the like. In another example, the channel option 126 may be utilized by individuals to acquire deals and/or acquire items in association with the deals from the service provider 102 when the respective client devices of the individuals are not connected to a local area network, a wide area network, and so forth. In the offline scenarios, the respective client devices of individuals may store information regarding transactions that take place when the respective client devices are not connected to one or more particular networks, and then exchange the stored information related to the transactions when the respective client devices become connected to one or more particular networks.

Although, the illustrative example of FIG. 1 shows a particular number of channels and a particular number of channel options, the architecture 100 may include any number of channels and/or channel options. In addition, channels and/or channel options may be added to the architecture 100. Thus, the architecture 100 is extensible and the service provider 102, merchants, individuals, third-parties, or combinations thereof, may be involved in adding channels and/or channel options to the architecture 100.

In a particular implementation, at 130, the service provider 102 determines one or more channel options 124-128 to be utilized for at least one of the channels 114-122 with respect to the merchant 104 for the deal 112. In some cases, the service provider 102 may utilize various types of data to determine the respective channel options 124-128 to be utilized for the channels 114-122 with respect to the merchant 104 for the deal 112. For example, when determining the particular channel options 124-128 to associate with the respective channels 114-122, the service provider 102 may consider performance of previous deals offered by the merchant 104. The performance of the previous deals may correspond to a number of instances of a particular deal that were acquired, a number of instances of a particular deal that were redeemed, a number of instances of a particular deal that were acquired per a number of individuals receiving information about the particular deal, combinations thereof, and the like. The service provider 102 may also consider number of deals of the merchant 104 previously offered via the service provider 102, channel options 124-128 utilized with respect to previous deals of the merchant 104, or both, when determining the channel options 124-128 to utilize with respect to the channels 114-122. Further, the service provider 102 may also utilize preferences of the merchant 104 with respect to the channel options 124-128 for at least one of the channels 114-122 and/or ratings of the merchant 104 provided by individuals, deal sourcers, etc., to determine the channel options 124-128 to associate with the channels 114-122.

In an illustrative example, the service provider 102 may determine that the first channel option 124 is to be utilized with respect to the advertising channel 114 for the deal 112 and that the second channel option 126 is to be utilized with respect to the publishing channel 116 for the deal 112. To illustrate, the service provider 102 may determine that the first channel option 124 for the deal 112 is a smart phone and that the second channel option 126 for the deal 112 is a local deals site of the service provider 102. Thus, individuals may receive information about the deal 112 via the advertising channel 114 on their smart phones and access an option to acquire the deal 112 via the publishing channel 116 on the local deals site of the service provider 102. The service provider 102 may also determine one or more of the channel options 124-128 to utilize with respect to the acquisition channel 118, the redemption channel 120, and the return/refund channel 122. In some cases, the channel options 124-128 associated with one or more of the channels 114-122 may be the same, while in other cases, the channel options 124-128 associated with one or more of the channels 114-122 may be different.

Additionally, the service provider 102 may determine that different channel options 124-128 are associated with particular channels 114-122 for different merchants. Thus, the channel options 124-128 associated with one or more of the channels 114-122 for the merchant 104 are different from the channel options 124-128 associated with one or more of the channels 114-122 for another merchant. Further, the channel options 124-128 associated with each channel 114-122 may vary for different deals offered by the merchant 104. Consequently, the channel options 124-128 determined by the service provider 102 for the channels 114-122 with respect to the deal 112 may be different from the channel options 124-128 determined by the service provider 102 for the channels 114-122 with respect to a different deal.

At 132, the service provider 102 may identify individuals to receive information about the deal 112. In some situations, the service provider 102 may analyze data about a number of individuals to determine whether the individuals may have some interest in acquiring the deal 112. In certain cases, the individuals may have requested and/or opted-in to receiving information about deals provided by the service provider 102. In a particular implementation, the service provider 102 may analyze data to identify individuals to receive information about the deal 112 that includes deal acquisition history of the individuals, item acquisition history of the individuals, payment instrument transaction information of the individuals, item search/browse history of the individuals, deal search/browse history of the individuals, search engine history of the individuals, location of the individuals, preferences of the individuals, demographic information of the individuals, profile information of the individuals, combinations thereof, and so forth.

The service provider 102 may also consider information regarding channel options 124-128 that is associated with the individuals in identifying individuals to receive information about the deal 112. To illustrate, the service provider 102 may analyze channel option usage history of the individuals, category of computing devices owned by the individuals, usage history of computing devices of the individuals, operating systems executing on the computing devices of the individuals, recent activity associated with computing devices of the individuals, combinations thereof, and so on. In particular, the service provider 102 may match channel options 124-128 associated with the individuals to the channel options 124-128 that have been determined by the service provider 102 with respect to the merchant 104 for the deal 112. For example, the service provider 102 may determine that information about the deal 112 will be provided via smart phone on the advertising channel 114. The service provider 102 may then determine that individuals having a smart phone are potential members of a target audience for the deal 112, that individuals currently operating a smart phone are potential members of a target audience for the deal, that individuals previously utilizing a smart phone to receive information about deals are potential members of a target audience for the deal 112, and the like.

In the illustrative example of FIG. 1, the service provider 102 may determine that one or more of individuals 134-138 are to receive information about the deal 112. Each of the individuals 134-138 may operate at least one respective client device represented by client devices 140-144. The client devices 140-144 may include a laptop computer, a desktop computer, a smart phone, an electronic reader device, a mobile handset, a personal digital assistant (PDA), a portable navigation device, a portable gaming device, a tablet computer, a watch, a portable media player, another client device, combinations thereof, and the like.

After identifying individuals to receive information about the deal 112, at 146, the service provider 102 may provide information about the deal 112 to the individuals via one or more of the channel options 124-128. For example, the service provider 102 may provide information about the deal 112 to the individuals 134-138 via the advertising channel 114. In a particular implementation, the service provider 102 may utilize one or more of the channel options 124-128 to provide the information about the deal 112, such as a smart phone, a site of the service provider, a social networking site, and the like, to the individuals 134-138. The service provider 102 may also provide information about the deal 112 to the individuals 134-138 via the publishing channel 116 utilizing one or more of the channel options 124-128. In these situations, the service provider 102 may also provide an input option that is selectable to initiate a transaction to acquire the deal 112.

At 148, the service provider 102 may conduct transactions with respect to the deal 112 via one or more of the channel options 124-128 for at least one of the individuals included in the target audience for the deal 112. The transactions may include one or more transactions to acquire the deal 112 where communications are exchanged with respect to the transactions via the acquisition channel 118. The transactions conducted by the service provider 102 with respect to the deal 112 may also include one or more transactions to acquire items in association with the deal. In certain implementations, when items associated with the deal 112 may be acquired from an online retail site of the service provider 102 and/or when a site of the merchant 102 receives ecommerce services from the service provider 102, the service provider 102 may participate in transactions to acquire items in association with the deal 112. The communications exchanged during transactions to acquire items in association with the deal 112 may take place with respect to the redemption channel 120. Further, the service provider 102 may conduct transactions related to the return and refund of the deal 112 and/or transactions related to the return and refund of items acquired in association with the deal. The communications associated with transactions related to the return and/or refund of the deal 112 and/or items acquired in association with the deal 112 may be exchanged via the return/refund channel 122.

In certain implementations, the service provider 102 may provide incentives for individuals, such as the individuals 134-138, to utilize particular channel options 124-128 and/or to utilize multiple channel options 124-128 with respect to the channels 114-122. For example, the service provider 102 may provide discounts, provide promotions (e.g. promotional points), and so forth, on deals and/or items acquired via certain channel options 124-128. In some cases, the service provider 102 may monitor usage by an individual of the channel options 124-128 and provide incentives for the individual to utilize one or more channel options 124-128 that the individual has not previously utilized above a threshold level. To illustrate, the service provider 102 may determine that an individual has not utilized an electronic reader device to acquire a threshold number of deals. Accordingly, the service provider 102 may provide incentives to the individual to acquire deals via the electronic reader device. Further, the service provider 102 may provide incentives for individuals to utilize multiple channel options 124-128 with respect to the channels 114-122. Thus, the service provider 102 may provide incentives for individuals to acquire a deal via a first channel option and redeem the deal via a second channel option that is different from the first channel option. In other cases, the service provider 102 may offer incentives for individuals to acquire different deals via different channel options 124-128, to redeem different deals via different channel options 124-128, and so forth.

In some cases, the service provider 102 may associate particular channel options 124-128 with individuals and/or merchants based on certain factors related to the service provider 102 offering the channel options 124-128 with respect to the individuals and/or merchants. To illustrate, the cost of providing some channel options 124-128 may be lower than the cost of providing other channel options 124-128. Accordingly, the service provider 102 may more frequently associate one or more respective channel options 124-128 with individuals and/or merchants that have a lower cost to the service provider 102 than the other channel options 124-128. In another illustration, the service provider 102 may manage communications with respect to certain channel options 124-128, while a third-party manages communications with respect to other channel options 124-128. In these scenarios, the service provider 102 may associate certain channel options 124-128 with individuals and/or merchants more often when the channel options 124-128 are managed by the service provider 102.

Example Frameworks

Figure 2:
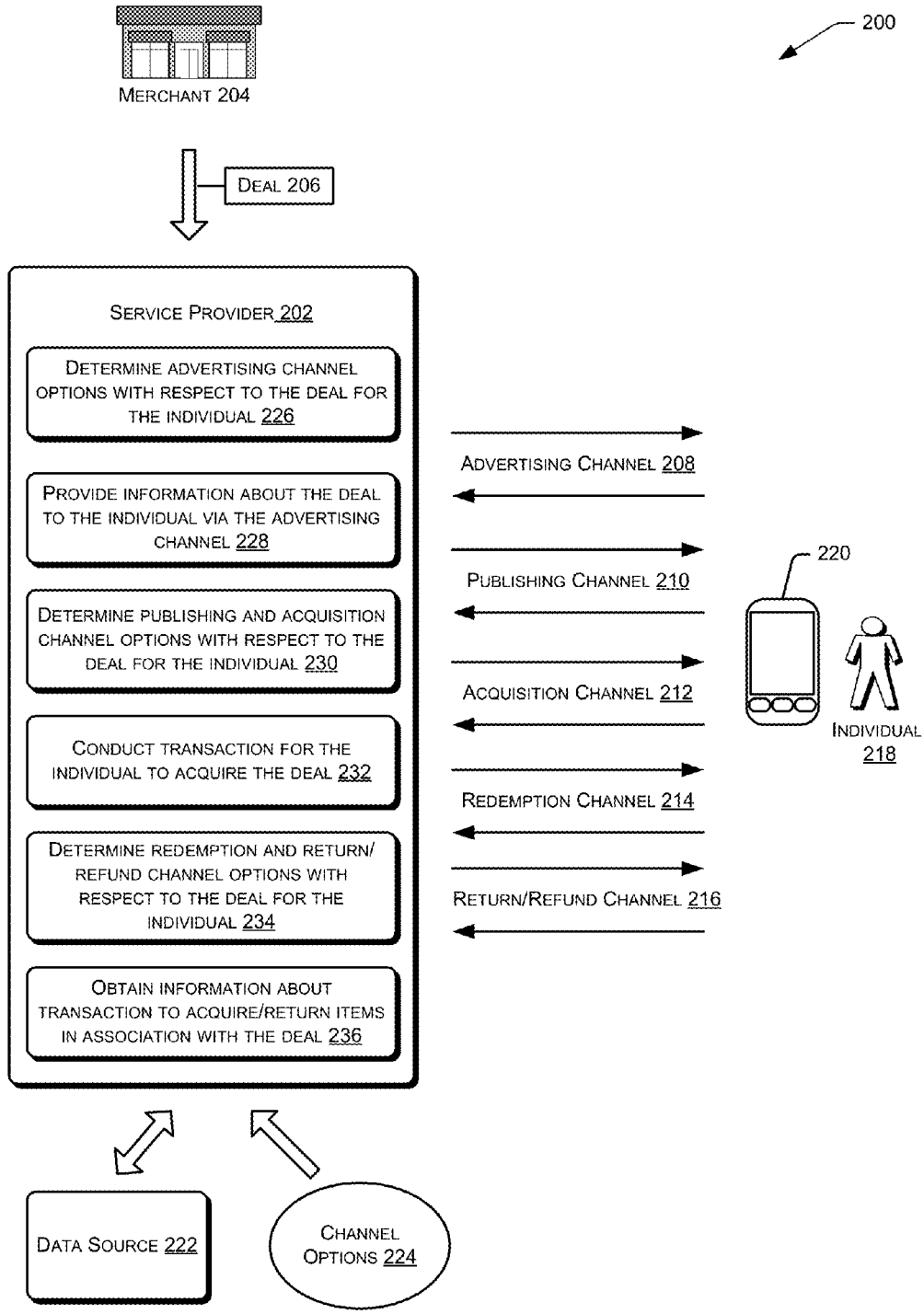
FIG. 2 illustrates a framework to manage deal-based communications between a service provider and an individual via a number of channels utilizing one or more options per channel.

FIG. 2 illustrates a framework 200 to manage deal-based communications between a service provider and an individual via a number of channels utilizing one or more options per channel. In particular, the framework 200 includes a service provider 202 and a merchant 204. The service provider 202 may offer one or more deals, such as deal 206, on behalf of merchants (e.g. merchant 204), deal sourcers, or both. Communications relating to the deal 206 may be exchanged via one or more of the channels, such as an advertising channel 208, a publishing channel 210, an acquisition channel 212, a redemption channel 214, and a return/refund channel 216. The communications may be exchanged via the channels 208-216 in conjunction with informing individuals, such as individual 218, about the deal 206, the acquisition of the deal 206 by the individual 218, the redemption of the deal 206 by the individual 218, returns and/or refunds associated with the deal 206 that are initiated by the individual 218, or combinations thereof. The individual 218 may send and/or receive communications via the channels 208-216 by operating one or more client devices, such as client device 220.

The framework 200 also includes one or more data sources represented by data source 222. The service provider 202 may obtain information from the data source 222 to determine one or more channel options 224 to associate with the channels 208-216, to identify a target audience for the deal 206, or both. The data source 222 may include a data store locally or remotely coupled to the service provider 202 that stores information collected by the service provider 202, information obtained from the merchant 204, information obtained from the client device 220 of the individual 218, or combinations thereof. The data source 222 may also be a site that provides information about individuals, merchants, or both, such as a social networking site, a micro-blogging site, a business directory site, and the like. The data source 222 may also be a third party entity, such as a financial institution, a payment services provider, and so on. In certain situations, information about the individual 218, the merchant 204, or both, may not be obtained from the data source 222 without receiving authorization from the individual 218 or the merchant 204. The channel options 224 may include various means to exchange communications and conduct transactions with respect to deals offered by the service provider 202, such as the deal 206.

In an illustrative implementation, at 226, the service provider 202 determines advertising channel options with respect to the deal 206 for the individual 218. The service provider 202 may utilize data obtained from the data source 222 to determine the advertising channel options with respect to the deal 206 for the individual 218. At 228, the service provider 202 may provide information about the deal 206 to the individual 218 via the advertising channel 208. In certain instances, the individual 218 may utilize the client device 220 to access the information about the deal 206 via certain channel options 224 of the advertising channel 208, such as a site of the service provider 202, a site of the merchant 204, a social networking site, a micro-blogging site, and so forth. Additionally, the service provider 202 may directly send information about the deal 206 to the client device 220 via the advertising channel 208. For example, the service provider 202 may send an email, a message a phone call, etc. to the client device 220 with information about the deal 206. The information provided by the service provider 202 about the deal 206 may include information about the merchant 204 (e.g. ratings of the merchant 204, locations of the merchant 204, items offered by the merchant 204, etc.), information about the deal 206 (e.g. terms of the deal 206, items associated with the deal 206, etc.), or both. Additionally, the information about the deal 206 provided to the individual 218 via the advertising channel 208 may include one or more links that are selectable to access a page of a site that includes an input option selectable to acquire the deal 206.

At 230, the service provider 202 may determine publishing and acquisition channel options with respect to the deal 206 for the individual 218. The service provider 202 may determine the publishing and acquisition channel options based, at least in part, on data obtained from the data source 222. The publishing channel options may provide the individual 218 with an opportunity to acquire the deal 206, such as a link or input option that is selectable to initiate a transaction to acquire the deal 206. The individual 218 may utilize the client device 220 to obtain information about the deal 206 via the publishing channel 210. For example, the individual 218 may access a page of a site using a browser application that is dedicated to the deal 206 and that includes an option selectable to acquire the deal 206. The individual 218 may also utilize a client device application, such as a mobile device app, to access content that includes an input option selectable to initiate a transaction to acquire the deal 206. In some cases, the information available via the channel options 224 associated with the publishing channel 210 may be accessed via information provided in association with the advertising channel 208. To illustrate, upon accessing and/or receiving information about the deal via a channel option 224 of the advertising channel 208 (e.g. a site of the service provider 202, a mobile device app, an email, etc.), the individual 218 may select an input option to receive additional information about the deal 206 including an input option to acquire the deal 206. Consequently, the individual 218 may receive and/or access content that includes an input option to acquire the deal 206 via one or more channel options of the publishing channel 210.

Additionally, at 232, the service provider 202 may conduct and/or facilitate a transaction for the individual 218 to acquire the deal 208. In particular, the channel options 224 of the acquisition channel 212 may provide the individual 218 with information related to a transaction to acquire the deal 206. For example, the information exchanged via the channel options 224 of the acquisition channel 212 may be directed to obtaining payment instrument information from the individual 218, obtaining identifiers of the individual 218 to access payment instrument information, obtaining identifiers of the individual 218 to access account information of the individual 218, obtaining authorization to draw from a payment instrument and/or account of the individual 208, and so forth. Further, the information communicated via the channel options 224 of the acquisition channel 212 may include confirmation of the acquisition of the deal 206, a voucher associated with the deal 206, a redemption code associated with the deal 206, combinations thereof, and the like. In a particular implementation, the individual 218 may access a site of the service provider 202 via the client device 220 to provide payment instrument information to acquire the deal 206 and obtain a redemption code for the deal 206. In some cases, the channel options 224 of the advertising channel 212 may be accessed via certain channel options of the publishing channel 210. To illustrate, the individual 218 may access information related to the publishing channel 210 via a deals site or a site of the merchant 204 and upon selection of an option to acquire the deal 206, the client device 220 may be directed to a site of a payment services provider to acquire the deal. Additionally, or alternatively, the channel options of the acquisition channel 212 may be the same as the channel options 224 of the publishing channel 210. In one example, the individual 218 may select an input option on a page of a site of the service provider 202 to initiate a transaction to acquire the deal 206 and be directed to one or more additional pages of a site of the service provider 202 that includes an order pipeline to provide payment instrument information to acquire the deal 206 and to receive redemption information associated with the deal 206.

At 234, the service provider 202 determines redemption channel options and return/refund channel options with respect to the deal 206 for the individual 218. The service provider 202 may determine the channel options 224 for the redemption channel 214 and the return/refund channel 216 based at least partly on information obtained from the data source 222. At 238, the service provider 202 may obtain information about transactions to acquire items in association with the deal 206 via the redemption channel 214, transactions to return items in association with the deal 206 via the return/refund channel 216, and/or transactions to return the deal 206 via the return/refund channel 216. In some cases, the individual 218 may operate the client device 220 to acquire items in association with the deal 206 via certain redemption channel options. For example, the individual 218 may acquire items for a site of the service provider 202 that are offered in association with the deal 206. In other cases, the individual 218 may acquire items in association with the deal 206 from a site of the merchant 204, a site of an online retailer, and so forth. The individual 218 may also utilize a mobile device app executing on the client device 220 to acquire items in association with the deal 206. In some situations where the individual 218 acquires items in association with the deal 206 online, the individual 218 may provide a redemption code to indicate that the deal 206 applies to the acquisition of the items. The service provider 202 may receive the redemption code directly from the client device 220, from third parties (e.g. payment services providers, the merchant 204, etc.), or both.

In other situations, the channel options of the redemption channel 214 may relate to the acquisition of items at a location of the merchant 204. In some instances, the individual 218 may provide a voucher to the merchant 204 when acquiring items in association with the deal 206 that includes a redemption code. The merchant 204 may then provide the redemption code to the service provider 202. Additionally, the individual 218 may acquire items in association with the deal 206 at a location of the merchant 204 via mobile payment services. In these situations, a redemption code for the deal 206 may be provided to the service provider 202 via the client device 220, a mobile payments services provider, or both.

The individual 218 may also operate the client device 220 to return items acquired in association with the deal 206 and/or to return the deal 206 via certain return/refund channel options. In certain situations, the individual 218 may access a site of the service provider 202, the site of the merchant 204, or both, to provide information directed to the return of items acquired in association with the deal. In some cases, the individual 218 may provide payment instrument information, deal information (e.g. redemption code), address to deliver the items, combinations thereof, and the like. The individual 218 may also utilize a client device application executing on the client device 220 to return items in association with the deal 206. In other implementations, the individual 218 may return items acquired in association with the deal 206 at a location of the merchant 204. Further, the individual 218 may access a site of the service provider 202 and/or utilize a client device application to return the deal 206.

The determination of channel options described with respect to items 226, 230, and 234 may occur at various times. In some cases, these determinations may take place before the service provider 202 receives information about the deal 206, while in other cases, the service provider 202 may determine channel options 224 for one or more of the channels 208-216 at some time after receiving information about the deal 206 from the merchant 204, a deal sourcer, etc. Further, the channel options 224 determined for the individual 218 with respect to each channel 208-216 may depend on options 224 that are available based on the channel options 224 determined by the service provider 202 for the merchant 204. In addition, in some cases, the service provider 202 may determine a portion of the channel options 224 for the individual 218 based on information about the individual 218, while in other cases, a portion of the channel options 224 associated with the individual 218 may apply to each individual acquiring deals from the service provider 202.

Figure 3:
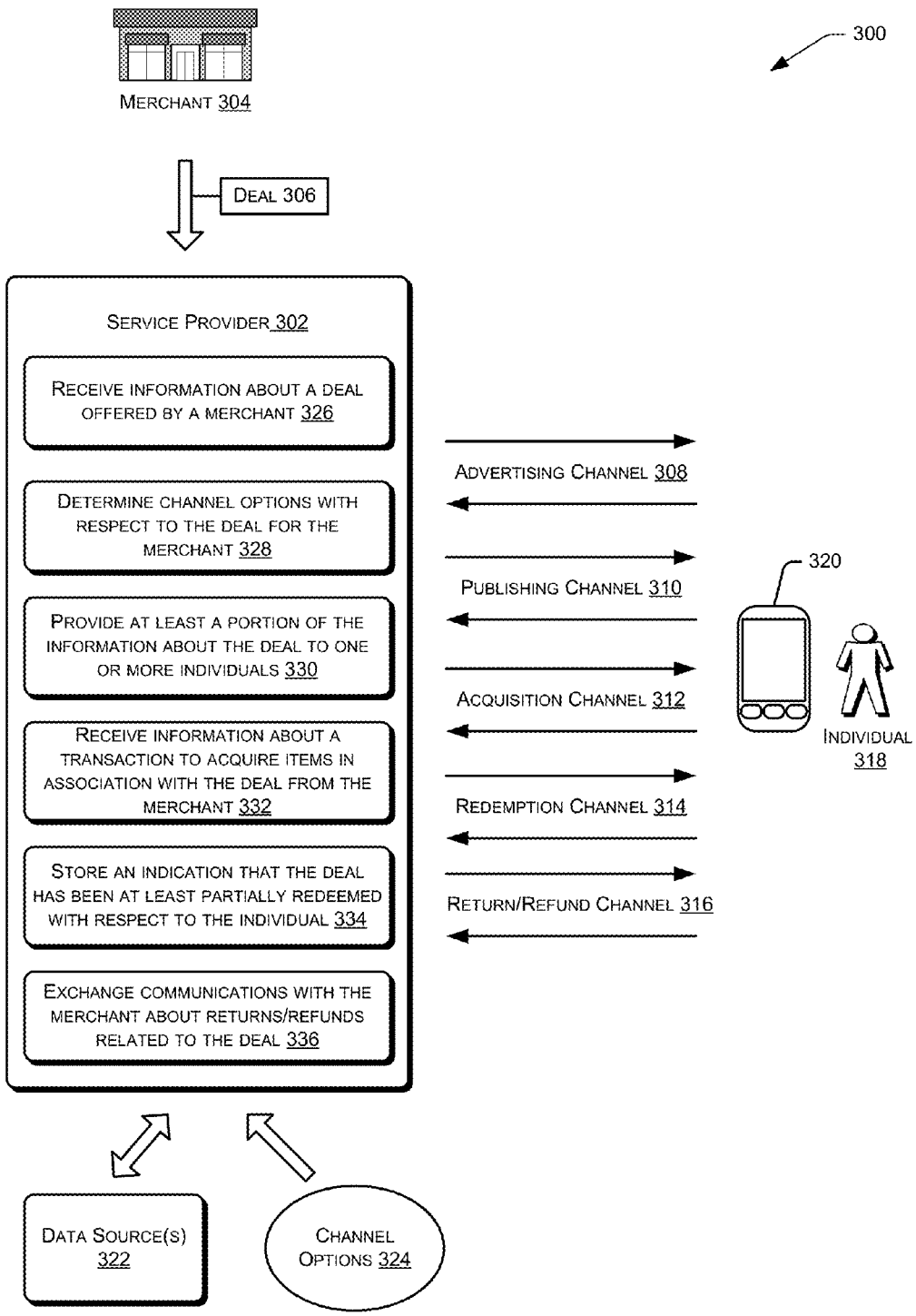
FIG. 3 illustrates a framework to manage deal-based communications between a service provider and a merchant via a number of channels utilizing one or more options per channel.

FIG. 3 illustrates a framework 300 to manage deal-based communications between a service provider and a merchant via a number of channels utilizing one or more options per channel. In particular, the framework 300 includes a service provider 302 and a merchant 304. The service provider 302 may offer one or more deals, such as deal 306, on behalf of merchants (e.g. merchant 304), deal sourcers, or both. Communications relating to the deal 306 may be exchanged via one or more of the channels, such as an advertising channel 308, a publishing channel 310, an acquisition channel 312, a redemption channel 314, and a return/refund channel 316. The communications may be exchanged via the channels 308-316 in conjunction with informing individuals, such as individual 318, about the deal 306, the acquisition of the deal 306 by the individual 318, the redemption of the deal 306 by the individual 318, returns and/or refunds associated with the deal 306 that are initiated by the individual 318, or combinations thereof. The individual 318 may send and/or receive communications via the channels 308-316 by operating one or more client devices, such as client device 320.

The framework 300 also includes one or more data sources represented by data source 322. The service provider 302 may obtain information from the data source 322 to determine one or more channel options 324 to associate with the channels 308-316, to identify a target audience for the deal 306, or both. The data source 322 may include a data store locally or remotely coupled to the service provider 302 that stores information collected by the service provider 302, information obtained from the merchant 304, information obtained from the client device 320 of the individual 318, or combinations thereof. The data source 322 may also be a site that provides information about individuals, merchants, or both, such as a social networking site, a micro-blogging site, a business directory site, and the like. The data source 322 may also be a third party entity, such as a financial institution, a payment services provider, and so on. In certain situations, information about the individual 318, the merchant 304, or both, may not be obtained from the data source 322 without receiving authorization from the individual 318 or the merchant 304. The channel options 324 may include various means to exchange communications and conduct transactions with respect to deals offered by the service provider 302, such as the deal 306.

In an illustrative implementation, at 326, the service provider 302 receives information about the deal 306 from the merchant 304 and/or a deal sourcer providing the deal 306 on behalf of the merchant 304. The deal information may include terms of the deal 306 (e.g. discount, time period available, items associated with the deal 306, etc.), thresholds related to the deal 306 (e.g. maximum participants, minimum participants, etc.), preferences with respect to the deal 306 (e.g. target audience characteristics, channel options, etc.), combinations thereof, and the like. At 328, the service provider 302 may determine channel options 324 with respect to the deal 306 for the merchant 304. The service provider 302 may utilize information obtained from the data sources 322, the merchant 304, or both, to determine the channel options 324 for the channels 308-316 with respect to the merchant 304. In some cases, the channel options 324 for the merchant 304 with respect to at least one channel 308-316 are different from the channel options 324 for the merchant 304 with respect to another one of the channels 308-316. In other cases, the channel options 324 for the channels 308-316 may be the same. In certain scenarios, the channel options 324 for the merchant 304 associated with each of the channels 308-316 may depend, at least in part on, ratings of the merchant 304, services acquired by the merchant 304 from the service provider 302, preferences for channel options of the merchant 304, computing devices of the merchant 304, payment arrangements between the merchant 304 and the service provider 302 for deals services, performance of previous deals offered by the merchant 304 via the service provider 302, terms of the deal 306, combinations thereof, and the like.

In an illustrative example, the service provider 302 may determine that information about the deal 306 may be accessible via a number of channel options 324 with respect to the advertising channel 308, such as a site of the service provider 302, a deals mobile device app provided by the service provider 302, a number of client devices (e.g. smart phone, electronic reader device, etc.), email, messages (e.g. text messages, image messages, etc.), or combinations thereof. Additionally, the service provider 302 may determine that the opportunity to acquire the deal 306 may be provided via certain channel options 324 with respect to the publishing channel 310, such as a local deals site of the service provider 302, a mobile device app provided by the service provider 302, and so forth, and that information associated with a transaction to acquire the deal 306 may be exchanged via certain channel options 324 with respect to the acquisition channel 312. The service provider 302 may also determine certain channel options 324 for items to be acquired in association with the deal 306 in conjunction with the redemption channel 314 and channel options 324 to enable the exchange of information associated with returns and/or refunds related to items acquired in association with the deal 306, the deal 306, or both.

At 330, the service provider 302 provides at least a portion of the information about the deal 306 to one or more individuals, such as the individual 320. The deal information may be provided to the individuals via one or more channel options 324 with respect to the merchant 304 that are associated with the advertising channel 308 and/or the publishing channel 310. In addition, at 332, the service provider 302 receives information about a transaction to acquire items in association with the deal 306 from the merchant 304 and, at 334, the service provider 302 stores an indication that the deal 306 has been at least partially redeemed with respect to the individual 318. In a particular example, the merchant 304 may provide a redemption code to the service provider 302 indicating that the deal 306 has been redeemed by the individual 320. The service provider 302 may also receive an amount of the transaction to determine whether the deal 306 has been fully redeemed or partially redeemed by the individual 318.

Further, at 336, the service provider 302 exchanges communications with the merchant about returns and/or refunds related to the deal 306. In some cases, the service provider 302 may receive an indication from the merchant 304 that items acquired by the individual 318 in association with the deal 306 have been returned. In these cases, the service provider 302 may modify a value and/or status of the deal 306 in response to the items being returned. In certain scenarios, the service provider 302 may send communications to the merchant 304 indicating that the individual 308 has returned the deal 306. In these scenarios, the service provider 302 may indicate that the redemption code of the deal 306 with respect to the individual 318 is no longer valid.

Example System

Figure 4:
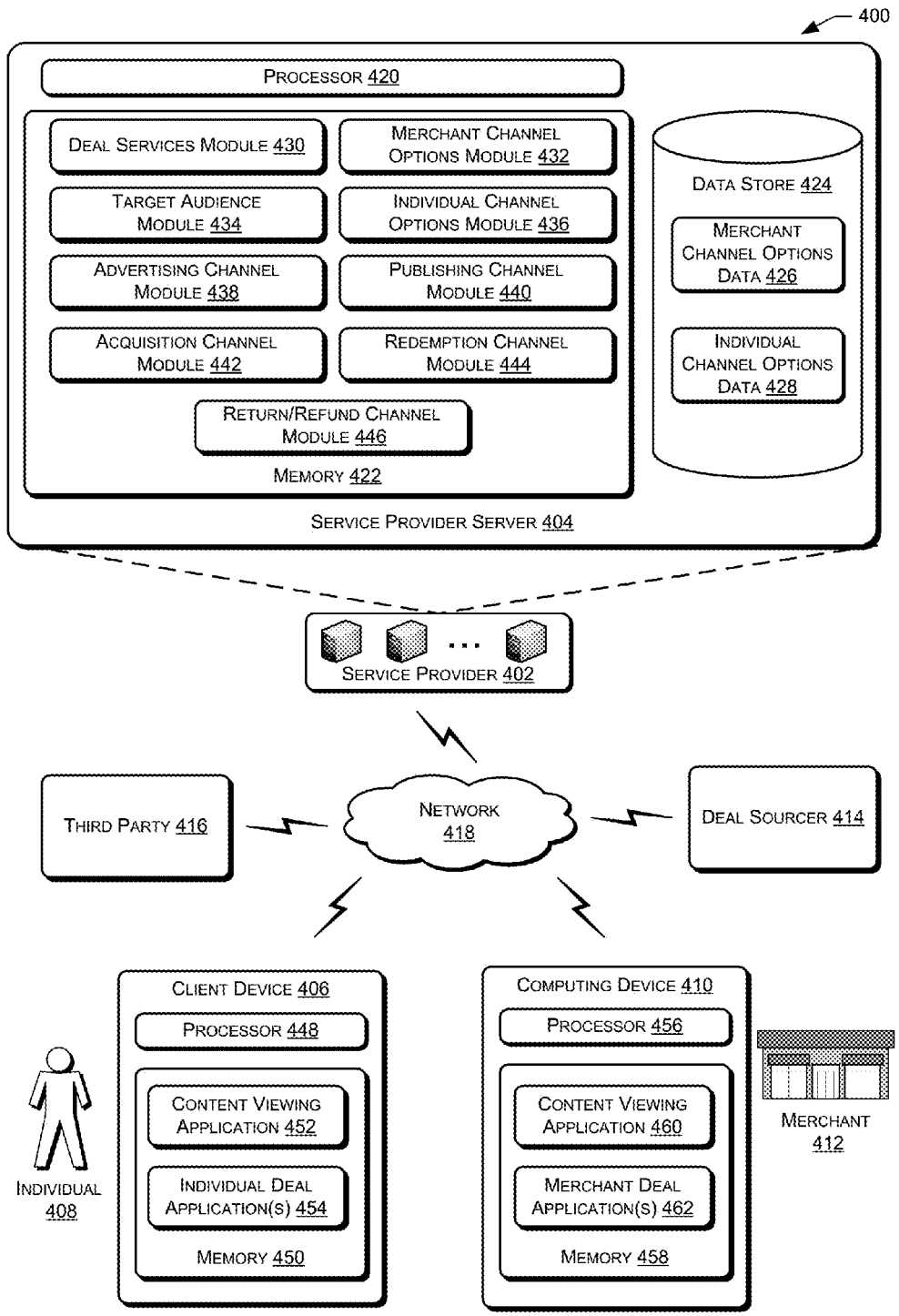
FIG. 4 shows a system to manage communications related to deals via a number of channels and providing a number of options per channel.

FIG. 4 shows a system 400 to manage communications related to deals via a number of channels and providing a number of options per channel. In particular, the system 400 includes a service provider 402 and a representative service provider server 404 that may comprise a single server, a cluster of servers, a server farm or data center, and so forth, although other server architectures (e.g., a mainframe architecture, a cloud computing architecture, etc.) may also be used. The system 400 also includes a client device 406 operated by an individual 408. In some situations, the individual 408 may acquire deals via the client device 406 for personal use, as gifts for others, for business purposes, or combinations thereof. The client device 406 may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like.

Additionally, the system 400 may include a computing device 410 of a merchant 412 that offers items for acquisition by individuals. In some cases, the computing device 410 may be operated by a representative of the merchant 412. The computing device 410 may include a client device, a server computer, a point-of-sale device, or combinations thereof.

In addition, the system 400 includes one or more deal sourcers represented by deal sourcer 414 that may aggregate deals from a number of merchants, such as the merchant 412. Further, the system 400 includes one or more third parties represented by third party 416. In certain situations, the third party 416 may be involved in conducting transactions to acquire deals, transactions to acquire items in association with deals, or both. In particular, the third party 416 may include financial entities, such as credit card companies, banks, credit unions, other payment entities, combinations thereof, and the like. Further, the third party 416 may include a mobile payment services provider that participates in transactions for individuals to acquire items from merchants via an application executing on client devices of the individuals, rather than providing physical payment instruments to merchants. The third party 416 may also be a data source that provides information to the service provider 402, such as a social networking site, a micro-blogging site, a content sharing site, a search engine site, combinations thereof, and the like. The service provider server 404, the client device 406, the computing device 410, the deal sourcer 414, the third party 416, or combinations thereof, may communicate via a network 418. The network 418 includes any one or combination of multiple different types of wired and wireless networks, such as the Internet, cable networks, satellite networks, wide area wireless communication networks, wired local area networks, wireless local area networks, and public switched telephone networks (PSTN).

The service provider server 404 includes one or more processors represented by processor 420. The service provider server 404 also includes memory 422 that is accessible by the processor 420. The memory 422 is an example of computer readable storage media and may include volatile memory, nonvolatile memory, removable memory, non-removable memory, or a combination thereof. For example, the memory 422 may include, but is not limited to, RAM, ROM, EEPROM, flash memory, one or more hard disks, solid state drives, optical memory (e.g. CD, DVD), or other non-transient memory technologies. The memory 422 may store a number of modules including computer-readable instructions executable by the processor 420 to redeem deals offered by merchants.

The service provider server 404 also includes, or is coupled to, a data store 424 that may include, but is not limited to, RAM, ROM, EEPROM, flash memory, one or more hard disks, solid state drives, optical memory (e.g. CD, DVD), or other non-transient memory technologies. The data store 424 stores merchant channel options data 426 that includes information about merchants that provide deals to be offered by the service provider 402. The merchant channel options data 426 may include performance of previous deals of merchants, ratings of the merchants, reviews of the merchants, payment arrangements between merchants and the service provider 402, computing device information of merchants (e.g. operating systems executed, hardware components, software applications executed, etc.), services acquired by merchants from the service provider 402, preferences of the merchant (e.g. channel option preferences, target audience preferences, etc.), number of deals previously offered by merchants via the service provider 402, channel option usage with respect to deals offered by merchants, combinations thereof, and the like.

The data store 424 also stores individual channel options data 428 that includes information about individuals that acquire deals via the service provider 402. The individual channel options data 428 may include deal acquisition history of individuals, item acquisition history of individuals, preferences of individuals (e.g. preferences to receive deals from certain merchants, preferences to receive deals related to certain items, preferences to utilize certain channel options, etc.), item search/browse history of individuals, deal browse/search history of individuals, transaction information for acquisitions of items and/or deals by individuals, location of individuals (e.g. current location, predicted location, user specified location, etc.), computing device usage history of individuals, computing device currently being utilized by individuals, information about computing devices of individuals (e.g. operating systems executed, hardware components, applications executed, etc.), channel option usage history for individuals, recent activity on computing devices of individuals, combinations thereof, and the like.

The merchant channel options data 426 and the individual channel options data 428 may be obtained from a number of data sources. In some situations, portions of the merchant channel options data 426 and/or portions of the individual channel options data 428 may be collected by the service provider 402 and stored in the data store 424. For example, the service provider 402 may collect information about channel options utilized by individuals to access information about deals offered on behalf of merchants, information about channel options utilized by individuals to acquire items in association with deals offered on behalf of merchants, information about channel options utilized by individuals to redeem deals offered on behalf of merchants, combinations thereof, and so forth. The service provider 402 may also collect information about acquisition of deals offered via the service provider 402, information about redemption of deals offered via the service provider 402, information about terms of deals offered via the service provider 402, reviews of merchants, ratings of merchants, combinations thereof, and so on. In some cases, the merchant channel options data 426 may include data from accounts of merchants with the service provider 402 and the individual channel options data 426 may include data from accounts of individuals with the service provider 402 (e.g. profile information, payment instrument information, deals currently in effect, etc.). The merchant channel options data 426 and the individual channel options data 428 may also be obtained from computing devices of individuals, such as applications executing on the computing devices (e.g. calendar applications, email applications, etc.), computing devices of merchants, representatives of merchants, one or more sites (e.g. business directory site, social networking site, micro-blogging site, one or more sites of the service provider, etc.), third parties involved in transactions involving the acquisition and/or redemption of deals offered via the service provider 402, deal sourcers, combinations thereof, and the like.

The memory 422 stores a deal services module 430 that is executable by the processor 420 to offer deals for acquisition by individuals. The deals may be provided by merchants, such as the merchant 412, and/or deal sourcers, such as the deal sourcer 414. The deal services module 430 may receive information about the deals (e.g. terms of the deals, items associated with the deals, threshold criteria for the deals, etc.) from the merchants and deal sourcers via one or more user interfaces provided by the deal services module 430. The deals services module 430 may also receive information about the deals via email, message, interactive voice response (IVR) calls, combinations thereof, and the like.

The memory 422 may also store a merchant channel options module 432 that is executable by the processor 420 to determine channel options to be utilized to exchange communications with respect to deals offered by merchants via the service provider 402. The merchant channel options module 432 may utilize at least a portion of the merchant channel options data 426 to determine the channel options to associate with a particular merchant. The merchant channel options module 432 may determine one or more channel options for an advertising channel, a publishing channel, an acquisition channel, a redemption channel, a return/refund channel, or combinations thereof. In a particular example, the merchant channel options module 432 may determine that electronic reader devices and a site of the service provider 402 are channel options with respect to an advertising channel for the merchant 412 and that the site of the service provider 402 and a site of the merchant 412 are channel options with respect to a publishing channel and an acquisition channel for the merchant 412. The merchant channel options module 432 may also determine that a site of the service provider 402 and a physical location of the merchant 412 are channel options with respect to a redemption channel and a return/refund channel for the merchant 412.

In some cases, the merchant channel options module 432 may utilize threshold criteria to determine channel options for merchants. In certain scenarios, the merchant channel options module 432 may determine that a particular channel option is to be associated with merchants having previous deal acquisitions above a threshold number. In another example, the merchant channel options module 432 may determine that a particular channel option is to be associated with merchants having ratings above a specified threshold, a reputation with the service provider 402 above a specified threshold, and the like. Additionally, the merchant channel options module 432 may determine channel options for merchants based on the number of deal acquisitions and/or redemptions via certain channel options. For example, certain channel options may be associated with merchants when the number of acquisitions and/or redemptions via those channel options are above a specified threshold.

The merchant channel options module 432 may also determine channel options to associate with service provider 402 based on cost to the service provider 402 of exchanging communications via respective channel options. Further, the merchant channel options module 432 may determine channel options to associate with service provider 402 based on services acquired by merchants from the service provider 402. For example, merchants acquiring a particular level of service and/or particular services from the service provider 402 may be eligible to have their deals advertised via particular channel options with respect to an advertising channel. In certain instances, the merchant channel option module 432 may determine channel options to associate with merchants according to characteristics of deals provided by the merchants. Thus, merchants offering deals with discounts above a particular threshold and/or offering deals related to certain items may be associated with particular channel options with respect to one or more channels.

The memory 422 stores a target audience module 434 that is executable by the processor 420 to identify individuals to receive information about deals offered by the service provider 402 on behalf of merchants. The target audience module 434 may identify individuals to receive information about certain deals based on deal acquisition history of individuals, item acquisition history of individuals, item browse/search history of individuals, deal browse/search history of individuals, demographic information, preferences of individuals, preferences of merchants, account settings of individuals, payment instrument transaction information of individuals, financial institution data of individuals, social networking site account information of individuals, social networking site posts and messages of individuals, micro-blogging site posts of individuals, calendar information of individuals, location information of individuals, emails of individuals, messaging information of individuals, contacts information of individuals, browser search history of individuals, characteristics of the deals, combinations thereof, and the like. In an illustrative example, for a particular deal, the target audience module 434 may identify individuals that have certain characteristics (e.g. previous acquisition of deals from a particular merchant, particular demographic information, particular location information, etc.) and designate those individuals to receive information about the particular deal.

In some cases, the target audience for one deal may include different individuals than a target audience for another deal. In some instances, the target audience module 434 may determine individuals to include in a target audience for a particular deal based on channel option usage by the individuals. For example, the service provider 402, a merchant, a deal sourcer, or combinations thereof, may specify a preference to provide information about a particular deal to individuals that utilize one or more particular channel options with respect to certain channels. To illustrate, the target audience module 434 may include individuals that access information about deals with respect to an advertising channel via an electronic reader device or via a local deals site of the service provider 402. In another example, the target audience module 434 may include people in a target audience for a particular deal according to an amount of usage of certain channel options. In a particular illustration, the target audience module 434 may identify individuals that have acquired a threshold number of deals via a mobile device app and include those individuals in the target audience for the particular deal.

Additionally, the memory 422 stores an individual channel options module 436 that is executable by the processor 420 to determine channel options for individuals included in the target audience for a deal that are to be utilized to exchange communications in relation to the deal. In some cases, the channel options for individuals with respect to a particular deal may depend on the channel options determined for the merchant offering the particular deal. Thus, when the merchant channel options module 432 has determined specified channel options for the merchant offering the particular deal, the channel options available for the individuals in the target audience for the particular deal may be limited to at most the specified channel options associated with the merchant.

In certain implementations, the channel options associated with individuals may be based on threshold criteria for the individuals. For example, the individual channel options module 436 may associate particular channel options with individuals that have acquired a specified number of deals from the service provider 402 and/or a specified number of deals offered by a particular merchant. In another example, the individual channel options module 436 may associate certain channel options with individuals that have a specified channel option usage history. To illustrate, the individual channel options module 436 may associate particular channel options with individuals that have accessed information about a threshold number of deals via one or more specified channel options (e.g. via an electronic reader device, a smart phone executing a particular operating system, a local deals site of the service provider 402, etc.) with respect to the advertising channel, that have acquired a threshold number of deals via one or more specified channel options with respect to the acquisition channel, or both. The individual channel options module 436 may also consider channel option usage with respect to a publishing channel, a redemption channel, and/or a return/refund channel.

The individual channel options module 436 may also associate certain channel options with individuals based on characteristics of a particular deal. In these situations, certain channel options may be available with respect to a deal due to particular characteristics of the deal. For example, deals with a discount above a threshold may be associated with certain channel options with respect to one or more channels and individuals included in the target audience for those deals may be limited with respect to the available channel options for those deals. The channel options for individuals may also depend on characteristics of client devices associated with the individuals. For example, certain deals may be available to individuals having client devices executing a particular client device application. In another example, some deals may be available to individuals with client devices that include particular hardware components. In additional situations, the channel options associated with a particular individual may depend at least partly on channel options utilized by the particular individual with respect to a particular channel. To illustrate, when an individual utilizes a particular channel option to acquire a deal, the individual channel options module 436 may designate that the individual is to utilize a specified channel option to redeem the deal.

In some implementations, individuals may receive incentives for utilizing particular channel options for one or more channels and/or a specified amount of usage of the particular channel options (e.g. acquiring a specified number of deals via a mobile device app). For example, the service provider 402, merchants, and/or deal sourcers may award points or another indicator of value to individuals that utilize certain channel options with respect to one or more channels. The points may be accumulated and utilized as a form of value to acquire items, deals, and so on. Additionally, specified usage of particular channel options may qualify individuals to receive information about certain deals that are offered to individuals meeting specified criteria.

Further, the memory 422 stores an advertising channel module 438 that is executable by the processor 420 manage communications with respect to channel options associated with an advertising channel. In particular, the advertising channel module 438 may provide information about deals to individuals via certain channel options. The information provided via the advertising channel may include terms of the deals, information about items related to the deals, information about merchants offering the deals, combinations thereof, and so forth. The information may also include a link or another type of input option that is selectable to access additional information about the particular deal, additional information about the merchant, additional information about the items of the particular deal, an opportunity to acquire the deal, combinations thereof, and the like. In an illustrative example, the advertising channel module 438 may send an email and/or message to a target audience of a particular deal that includes information about the particular deal. In some cases, the information about particular deals may be provided to certain client devices, such as electronic reader devices, client devices executing a specified operating system, client devices executing a client device app of the service provider 402, etc. In another example, the advertising channel module 438 may provide pages of a site of the service provider 402 that include information about deals offered by the service provider 402 on behalf of merchants.

In a particular implementation, a channel option of the advertising channel may include a video call. In some cases, the video call may be handled by the service provider 402, while in other cases the video call may be handled by a third party service provider. In any case, the advertising channel module 438 may provide information about deals that is provided during the video call. To illustrate, two or more individuals may participate in a video call via one or more user interfaces and the user interfaces may include information about a particular deal and/or a link that is selectable to access additional information about the particular deal. In certain instances, the information may be related to deals that the individual viewing the user interface may be interested in. In other instances, the information may be related to deals that other participants in the video call may be interested in. Thus, information about deals that can be gifted to other participants in the video call may be provided during the video call. Although this implementation has been described with respect to a video call, the advertising channel module 438 may also provide information about deals during an audio call, and/or another form of two-way or multi-way communication.

In another particular implementation, the advertising channel module 438 may provide information about deals via a content sharing site, such as an image content sharing site, a video content sharing site, an audio content sharing site, combinations thereof, and the like. In some cases, the content sharing site may be a site of the service provider 402 or a third-party site. The information about deals may be provided with respect to certain images available via the content sharing site. In some situations, a particular deal may be in effect and an individual may capture content related to one or more items associated with the deal (e.g. an image of a particular product). The individual may then upload the content to the content sharing site and information about the deal may be provided when other individuals access the shared content. Additionally, individuals that have uploaded content related to a deal to the content sharing site may send a communication (e.g. email, message, etc.) to other individuals to share the content. In these situations, the communication may include information about the deal associated with the content. The information about the deal may include a link or other input option that is selectable to access additional information about the deal, an opportunity to acquire the deal, or both. In certain instances, particular individuals sharing content related to a deal may receive some form of value when sharing the content and/or when other individuals acquire the deal in response to the shared content provided by the particular individuals. For example, the individuals sharing the content related to the deal may receive a larger discount on items offered in association with the deal, an additional deal, and so forth. In some scenarios, the number of deals available with respect to particular shared content may be limited.

In certain implementations, individuals may share content related to an item acquired from a merchant and a deal may be established in response to the sharing of the content. Thus, merchants may specify that deals related to particular items may be launched when content related to the items is shared. In these situations, the service provider 402 may specify that a certain number of deals are available when content related to certain items is shared. When the service provider 402 receives an indication that content related to the deal items has been shared, such as via a site of the service provider 402 or via a third-party site, the advertising channel module 438 may provide information about the deal to the entity providing the indication that the content related to the deal items has been shared. The information about the deal may then be displayed when additional individuals access the content and/or when the particular individuals capturing the deals related content share the content in a communication to others. In some instances, the advertising channel module 438 may provide the information about the deal before the deal has been launched, such as to a third-party site, and the third-party site can provide the deal information upon the sharing of content including items related to the deal. The service provider 402 and/or the third-party content sharing site may determine that shared content includes items associated with a particular deal by analyzing tagging related to the shared content, via recognition techniques (e.g. image recognition, audio recognition, etc.), and the like. Accordingly, the service provider 402 may compare data of shared content with data about one or more items related to a particular deal to determine whether the shared content matches the one or more items of the deal.

The memory 422 also stores a publishing channel module 440 that is executable by the processor 420 to provide input options that are selectable to acquire deals via one or more channel options associated with a publishing channel. For example, the publishing channel module 440 may provide one or more user interfaces via one or more sites of the service provider 402, sites of merchants offering deals, certain mobile device apps, combinations thereof, and the like, that include input options that are selectable to acquire respective deals. In certain situations, the sites may be accessible to particular devices and/or particular individuals. In some cases, the user interfaces may include information about the deal, such as terms of the deals, information about items related to the deals, information about merchants offering the deals, combinations thereof, and so forth. The user interfaces provided by the publishing channel module 440 may be accessible via links provided by the advertising channel module 438.

In addition, the memory 422 stores an acquisition channel module 442 that is executable by the processor 420 to facilitate one or more transactions to acquire deals from the service provider 402, merchants, and/or deal sourcers. In an illustrative implementation, the acquisition channel module 442 may provide one or more user interfaces that obtain information to conduct transactions to acquire deals and/or that convey information about the transactions to acquire deals. In some instances, the user interfaces may obtain payment instrument information, delivery information, account identifiers (e.g. personal identification numbers, logins, passwords, phrases, etc.), combinations thereof, and the like. Additionally, some of the information needed to conduct the transactions may be accessible from account information stored by the service provider. The user interfaces may also provide information indicating when a transaction to acquire a deal is complete, information indicating confirmation of the acquisition of a deal, redemption information associated with acquisition of a deal (e.g. voucher, redemption code, etc.), combinations thereof, and so forth. In certain situations, the user interfaces may be part of an order pipeline provided by a particular site. In some implementations, the user interfaces provided by the acquisition channel module 442 may be accessible upon selection of an input option to acquire the deal provided by the publishing channel module 440. Further, access to the user interfaces provided by the acquisition channel module 442 may be limited to certain individuals, to specified client devices, or both.

The memory 422 stores a redemption channel module 444 that is executable by the processor 420 to manage communications related to the acquisition of items in association with deals. In some cases, the redemption channel module 444 may receive requests to acquire items in association with a particular deal. For example, the service provider 402 may provide a site that offers items associated with the particular deal for acquisition and individuals may redeem the particular deal by acquiring the respective items via the site of the service provider 402. Additionally, the redemption channel module 444 may receive redemption codes from individuals, merchants, deal sourcers, mobile payment services providers etc. In some situations, the redemption codes may be received via one or more user interfaces provider by the service provider 402, via a mobile device app of an individual and/or a merchant, via an application programming interface (API) provided by the service provider 402, combinations thereof, and the like. The redemption channel module 444 may also receive information about transactions to acquire items in association with a particular deal from entities handling transactions to acquire items in association with the deals, such as financial institutions, payment services providers, credit card companies, etc. The service provider 402 may utilize redemption information received from one or more sources to store an indication that a particular deal has been at least partially redeemed. In some instances, the redemption channel module 444 may also provide redemption information to individuals, merchants, deal sourcers, combinations thereof, and so on, indicating at least partial redemption of a deal with respect to a particular individual.

Further, the memory 422 stores a return/refund channel module 446 that is executable by the processor 420 to manage communications directed to the return of items acquired in association with deals, the return of certain deals, refunds associated with returned items acquired in association with deals, refunds associated with returned deals, or combinations thereof. The information received by the return/refund module 446 may be obtained via one or more user interfaces provided by the service provider 402, via one or more APIs provided by the service provider 402, via client device applications, combinations thereof, and the like. In certain scenarios, the return/refund channel module 446 may receive requests via a site of the service provider 402 to return one or more items acquired in association with a particular deal. The one or more items may have been acquired via a site of the service provider 402 and/or via a site of a merchant associated with the particular deal. The return/refund channel module 446 may also receive information indicating requests by individuals to return items acquired in association with deals from merchants, individuals, other entities, combinations thereof, and so forth. The return/refund channel module 446 may also receive information about transactions to refund value to individuals returning items previously acquired in association with a particular deal. In some cases, the information about the refund transactions may be received from a merchant associated with the particular deal, a third party involved in transactions to refund value to the individuals (e.g. financial institution, payment services provider, etc.), individuals involved in the refund transactions, combinations thereof, and so forth. The return/refund module 446 may also receive information about returns of deals offered by the service provider 402 on behalf of merchants and/or information about transactions to refund value to individuals returning the deals.

When items are returned in association with a deal, the service provider 402 may modify a value of the deal and/or a status of the deal with respect to a particular individual to indicate the return of items in association with the deal. Thus, the value of the deal may increase and/or the status of the deal may be modified from "Redeemed" of "Partially Redeemed" to "Acquired." Further, when a deal is returned, the service provider 402 may specify that a redemption code associated with the deal with respect to a particular individual is no longer valid.

The client device 406 includes a processor 448 and memory 450. The memory 450 is an example of computer readable storage media and may include volatile memory, nonvolatile memory, removable memory, non-removable memory, or a combination thereof. For example, the memory 450 may include, but is not limited to, RAM, ROM, EEPROM, flash memory, one or more hard disks, solid state drives, optical memory (e.g. CD, DVD), or other non-transient memory technologies. In addition, the memory 450 may store a number of applications including computer-readable instructions executable by the processor 448 to acquire and redeem deals. The client device 406 may also include one or more input/output devices (not shown), such as a display, a touchpad, a touch screen, a pointer device, speakers, microphones, keyboard, image capture devices (e.g. camera, scanner), and the like.

The memory 450 includes one or more content viewing applications represented by content viewing application 452 that is executable by the processor 448 to view electronic content provided by a number of sources. In some cases, the content viewing application 452 may be a browser application that may be executable to view pages of sites provided by electronic content sources. In particular, the content viewing application 452 may be executable by the processor 448 to access sites offering deals and offering items for acquisition in association with the deals, such as a site of the service provider 402, a site of the merchant, 412, and/or a site of the deal sourcer 414. The content viewing application 452 may also be executable by the processor 448 to access pages of sites associated with entering redemption information for deals acquired by the individual 408. The memory 450 may also include one or more individual deal applications 454 that are executable by the processor 448 to access information about deals, acquire deals, redeem deals, return deals and/or items in association with deals, combinations thereof, and so forth.

The computing device 410 includes a processor 456 and memory 458. The memory 458 is an example of computer readable storage media and may include volatile memory, nonvolatile memory, removable memory, non-removable memory, or a combination thereof. For example, the memory 458 may include, but is not limited to, RAM, ROM, EEPROM, flash memory, one or more hard disks, solid state drives, optical memory (e.g. CD, DVD), or other non-transient memory technologies. In addition, the memory 458 may store a number of applications including computer-readable instructions executable by the processor 456 to provide information about deals offered by the merchant 412, receive information about deals being provided by the service provider 402 on behalf of the merchant 412, conduct transactions related to items acquired in association with deals, and to redeem the deals offered by the merchant 412. The computing device 410 may also include one or more input/output devices (not shown), such as a display, a touchpad, a touch screen, a pointer device, speakers, microphones, keyboard, image capture devices (e.g. camera, scanner), and the like. In some situations, the computing device 310 may be a server, a client device (e.g. desktop computer, smart phone, eReader device, tablet computer, laptop computer, etc.), a point-of-sale device, combinations thereof, and the like.

The memory 458 includes one or more content viewing applications represented by content viewing application 460 that is executable by the processor 456 to view electronic content provided by a number of sources. In some cases, the content viewing application 460 may be a browser application that may be executable to view pages of sites provided by electronic content sources. In particular, the content viewing application 460 may be executable by the processor 456 to access a site of the service provider 402 to provide deal information to the service provider, such as terms of a deal to be offered by the service provider 402 on behalf of the merchant 412. Additionally, the content viewing application 460 may access pages of a site of the service provider 402 related to providing information associated with the redemption of deals, such as redemption codes, identifiers of individuals, identifiers of the merchant 412, combinations thereof, and so forth. The memory 458 may also include one or more merchant deal applications 462 that are executable by the processor 456 to provide information about deals offered by the merchant 412 to the service provider 402, receive information about deals of the merchant 412 offered via the service provider 402 (e.g. number of deals acquired, indications whether threshold numbers and/or values of deals have been satisfied, etc.), to provide redemption information to the service provider 402, to provide and/or receive information related to the return/refund of items acquired in association with a deal, information related to the return/refund of deals, combinations thereof, and so forth.

Example User Interfaces

Figure 5:
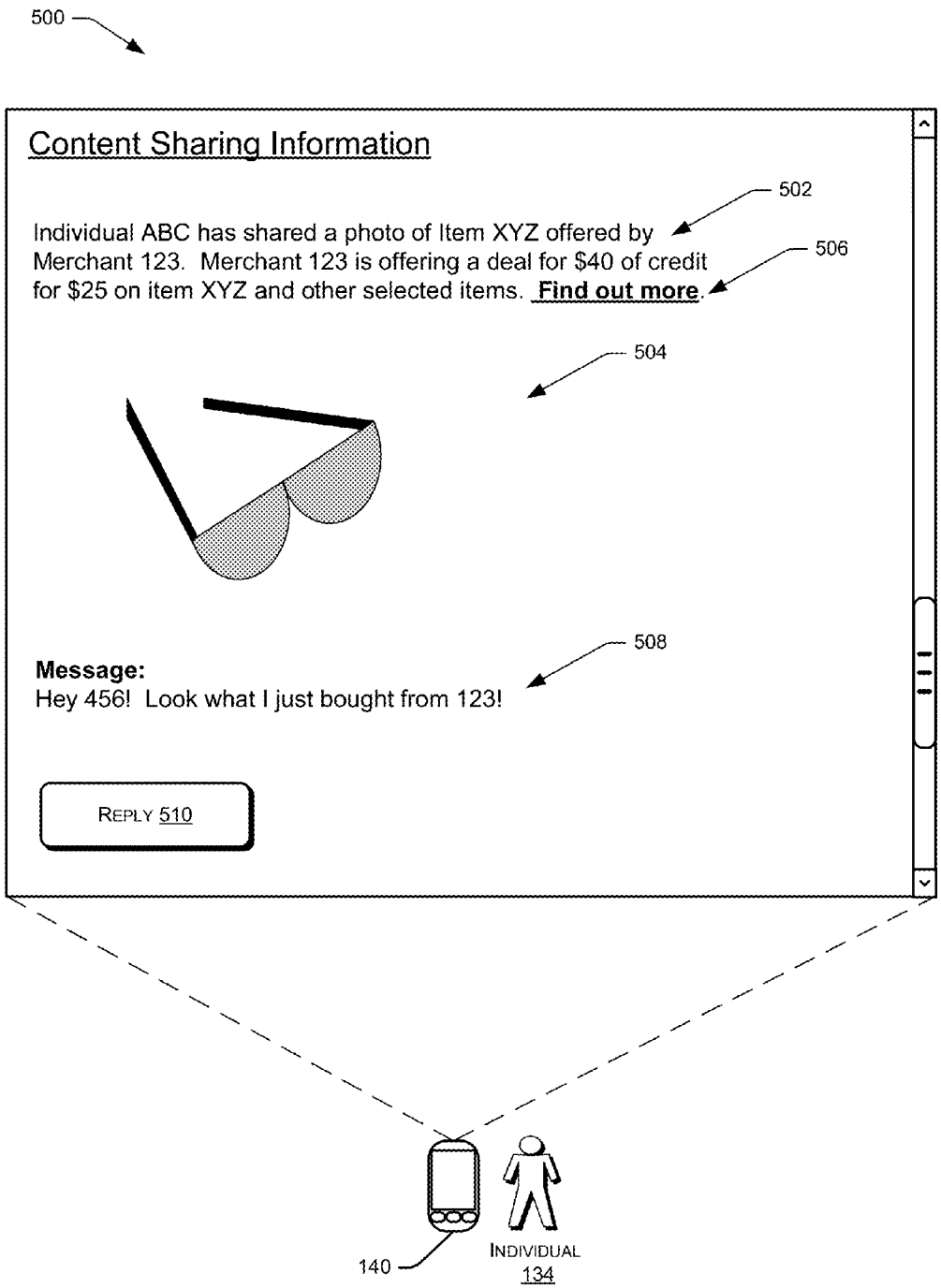
FIG. 5 shows a user interface including information about a deal that is accessible via a content sharing site.

FIG. 5 shows a user interface 500 including information about a deal that is accessible via a content sharing site. The user interface 500 may be provided via a display of a client device, such as the client device 140 operated by the individual 134. In some cases, the user interface 500 may comprise at least a portion of a page of a content sharing site, while in other cases, the user interface 500 may comprise at least a portion of a notification received from an individual sharing content with the individual 134. Additionally, the user interface 500 may include information provided via one or more channel options of an advertising channel.

The user interface 500 includes a portion 502 that includes information about a deal related to content 504 that someone has shared with individual 134. The content 504 may include one or more items associated with a particular deal. In the illustrative example shown in FIG. 5, the content 504 is an image, but in other implementations, the content 504 may include video content, audio content, text content, combinations thereof, and so on. The portion 502 also includes a link 506 that is selectable to obtain additional information about the items included in the content 504. In some cases, the additional information may be provided via one or more channel options of a publishing channel. Further, the user interface 500 includes a portion 508 that includes a message to the individual 134 from another individual sharing the content 504 with the individual 134. In addition, the user interface 500 includes an input option 510 that is selectable by the individual 134 to reply to the message of the portion 508.

Figure 6:
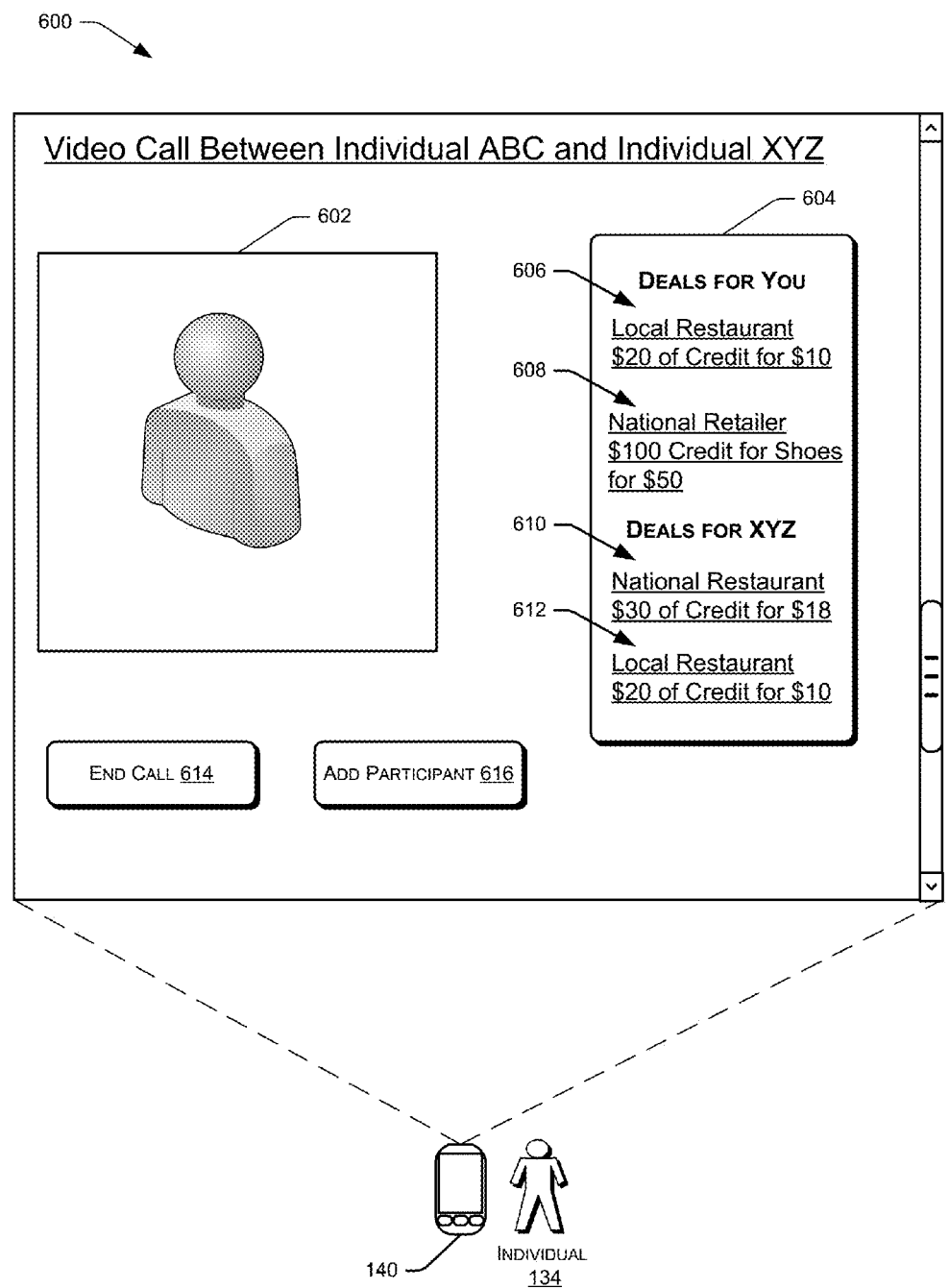
FIG. 6 shows a user interface including information about deals that is provided during a video call between two or more participants.

FIG. 6 shows a user interface 600 including information about deals that is provided during a video call between two or more participants. The user interface 600 may be provided via one or more channel options of an advertising channel. The user interface 600 may be provided via a display of a client device, such as the client 140, operated by the individual 134. In particular, the user interface 600 includes a portion 602 that includes image content, video content, or both of Individual XYZ that is participating in the video call with the individual 134 who is referred to as Individual ABC with respect to the video call. Audio content of the video call may be provided via one or more output devices of the client device 140.

The user interface 600 also includes a portion 604 that includes information about one or more deals related to the Individual ABC and/or the Individual XYZ. In the illustrative example of FIG. 6, the portion 604 includes deals 606 and 608 that are directed to the Individual ABC. The deals 606, 608 may be provided by a service provider and the Individual ABC may be included in a target audience identified by the service provider for the deals 606, 608. The information about the deals 606, 608 may include respective links that are selectable to access additional information about the deals 606, 608. In some cases, the additional information may be provided via one or more channel options of a publishing channel.

The portion 604 also includes deals 610 and 612 that are directed to the Individual XYZ. In these cases, the deals 610, 612 may represent recommendations for deals for the Individual ABC to gift to the Individual XYZ. The deals 610, 612 may be provided by a service provider and the Individual XYZ may be included in a target audience identified by the service provider for the deals 610, 612. The information about the deals 610, 612 may include respective links that are selectable to access additional information about the deals 610, 612. In some cases, the additional information may be provided via one or more channel options of a publishing channel.

Example Processes

FIGS. 7-10 show processes 700-1000 respectively, to manage communications related to deals via one or channel options with respect to each of a plurality of channels offered by a service provider. The processes 700-1000 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 7-10 may be performed by one or more of the components shown in FIGS. 1-6, such as the client devices 134-138, 220, 320, 406, the service provider server 404, the computing device 410, other computing devices, or a combination thereof.

Figure 7:
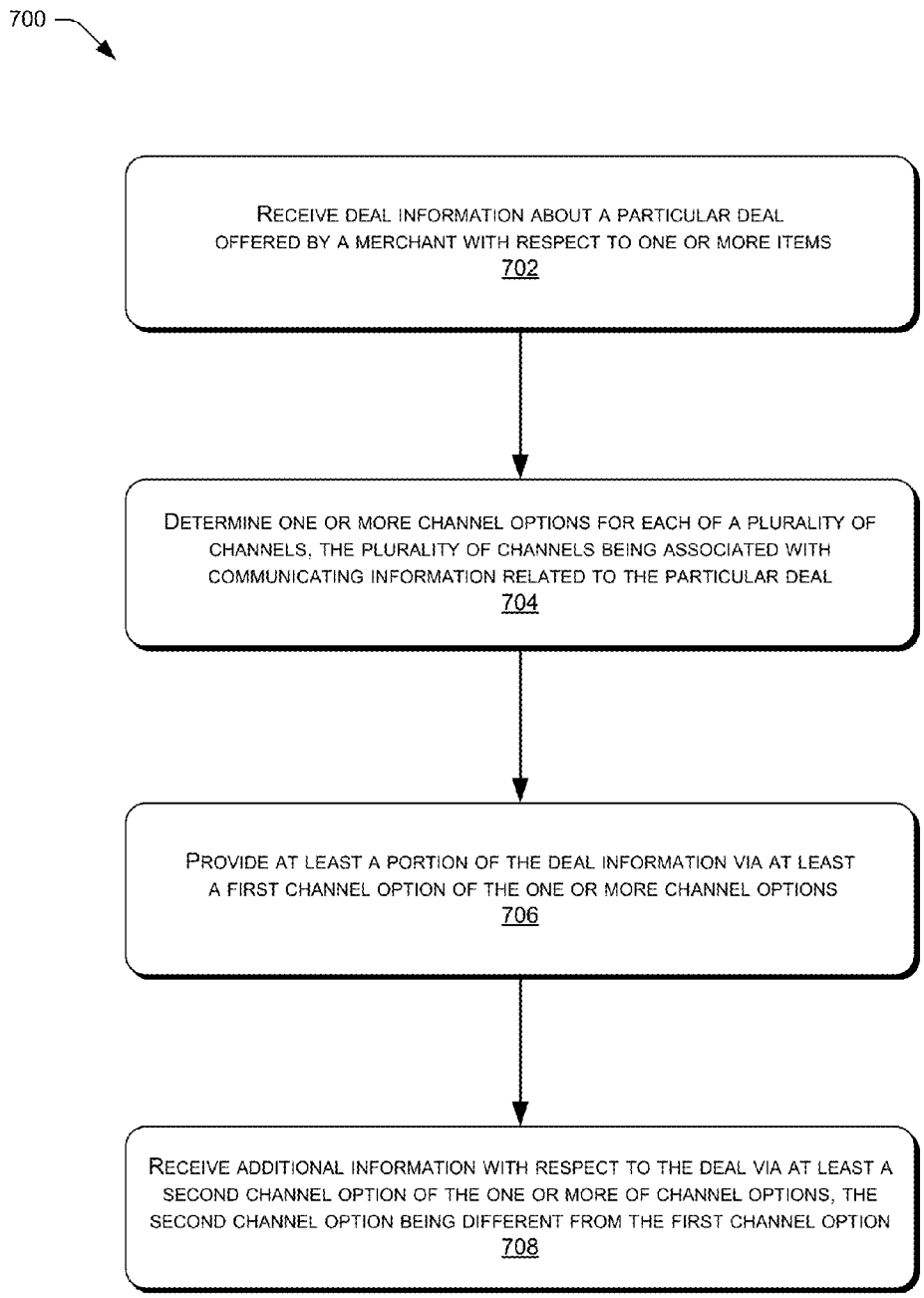
FIG. 7 is a flow diagram of a process to provide a number of channel options for each of a plurality of channels that facilitate the sending and receiving of deals-based communications.

FIG. 7 is a flow diagram of a process 700 to provide a number of channel options for each of a plurality of channels that facilitate the sending and receiving of deals-based communications. At 702, the process 700 includes receiving deal information about a particular deal offered by a merchant with respect to one or more items. The deal information may include one or more terms of the deal, preferences of the merchant and/or a deal sourcer with respect to the deal (e.g. target audience characteristics, threshold participants in the deal, etc.), information about the merchant, information about the one or more items, combinations thereof, and the like.

At 704, the process 700 includes determining one or more channel options for each of a plurality of channels. The plurality of channels may be associated with the communication of information related to the particular deal. The plurality of channels may include an advertising channel, a publishing channel, an acquisition channel, a redemption channel, a return/refund channel, or combinations thereof. In certain situations, the one or more channel options are may be determined for at least one channel of the plurality of channels based, at least in part, on terms of the particular deal, traffic associated with each of the one or more channel options, preferences of a service provider offering the deal on behalf of the merchant, acquisitions of the particular deal, or combinations thereof.

At 706, the process 700 includes providing at least a portion of the deal information via at least a first channel option of the one or more channel options. For example, the at least a portion of the information about the deal may be communicated to individuals during a video call with respect to the advertising channel. To illustrate, a service provider may provide one or more first deals to be displayed to an individual participating in the video call, where the one or more first deals may be available for acquisition by the individual. Additionally, the service provider may provide one or more second deals to be displayed to the individual participating in the video call, where the one or more second deals may be available for acquisition by the individual for an additional individual participating in the video call, or both. In some cases, the one or more first deals and the one or more second deals may be provided to an entity that provides services related to video calls. In other cases, the service provide video calls and provide user interfaces related to the video calls that include the one or more first deals, the one or more second deals, or both.

In other situations, a particular channel option of the one or more channel options includes a content sharing site. The content sharing site may provide access to text content, image content, video content, audio content, or combinations thereof, provided to the content sharing site by a number of individuals. In some cases, the content sharing site may be administered by a service provider offering the deal on behalf of the merchant, while in other cases, the content sharing site may be administered by a third-party.

When the content sharing site is administered by a third party, the service provider may provide specified information about the particular deal to the content sharing site. The specified information may be displayed when content of the content sharing site that is associated with at least one item of the one or more items is accessed by one or more individuals. To illustrate, when individuals access a page of the content sharing site that includes content with at least one item of the deal, the specified information about the deal may be provided on that page. In another illustration, when individuals share content by sending a communication via the content sharing site, the communication may include the shared content, and in cases where the shared includes an item association with the deal, the communication may also include information about the deal. Further, the service provider may provide incentives for individuals to share content that includes items associated with deals. Thus, when the service provider receives an indication that an individual has shared content associated with at least one item of the one or more items with one or more additional individuals, the service provider may provide value to the individual at least partly in response to receiving the indication. The value may be in the form of another deal, credit for subsequent purchases, promotional points that can be utilized to acquire particular items, combinations thereof, and the like.

At 708, the process 700 includes receiving additional information with respect to the deal via at least a second channel option of the one or more of channel options. The second channel option may be different from the first channel option. For example, the service provider may receive redemption information from client devices executing a mobile device app that is configured to provide redemption information related to the acquisition of at least one item of the one or more items of the deal. In another example, the service provider may provide information about a deal offered on behalf of a merchant to a number of individuals via channel options provided by the service provider and one or more of the individuals may acquire the deal from channel options provided by another entity, such as a site of a deal sourcer. In certain situations, the deal may be received by the service provider from the deal sourcer.

Figure 8:
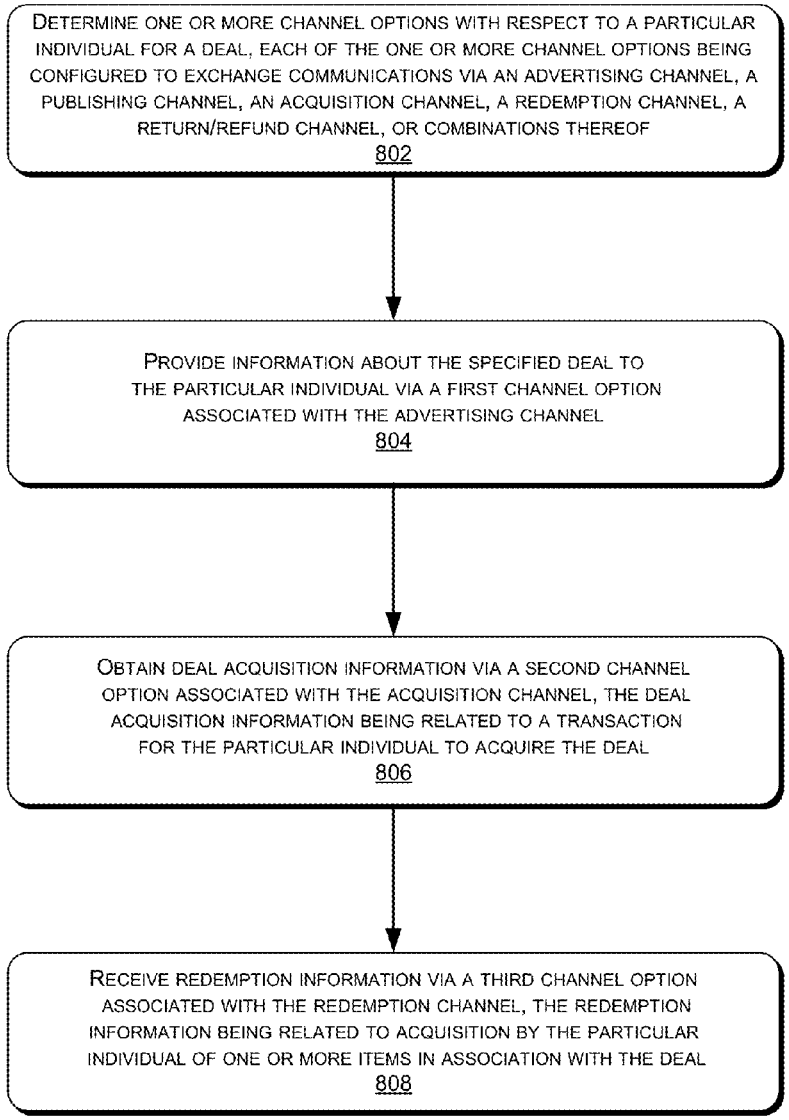
FIG. 8 is a flow diagram of a process to determine a number of channel options with respect to one or more channels for an individual to send and receive deals-based communications.

FIG. 8 is a flow diagram of a process 800 to determine a number of channel options with respect to one or more channels for an individual to send and receive deals-based communications. At 802, the process 800 includes determining one or more channel options with respect to a particular individual for a deal. At least a portion of the one or more channel options may be configured to exchange communications via an advertising channel, a publishing channel, an acquisition channel, a redemption channel, a return/refund channel, or combinations thereof. In some cases, at least one of the channel options determined for the individual with respect to one deal may be different from at least one of the channel options determined for the individual with respect to an additional deal.

At 804, the process 800 includes providing information about the deal to the particular individual via a first channel option associated with the advertising channel. The first channel option may be associated with a particular category of computing device (e.g. smart phone, electronic reader device, etc.), a category of communication (e.g. email, message, video call, etc.), and the like. In some cases, information about the deal may also be provided via a specified channel option of a publishing channel. The information about the deal provided via the specified channel option may include an input option that is selectable to acquire the deal.

At 806, the process 800 includes obtaining deal acquisition information via a second channel option associated with the acquisition channel. The deal acquisition information may be related to a transaction for the particular individual to acquire the deal. At 808, the process 800 includes receiving redemption information via a third channel option associated with the redemption channel. The redemption information being related to acquisition by the particular individual of one or more items in association with the deal. In certain situations, the channel options utilized with respect to particular channels may be different from one another. Thus, the channel options utilized to provide information about the deal via the advertising channel may be different from one or more channel options utilized to exchange information related to the redemption of the deal.

Figure 9:
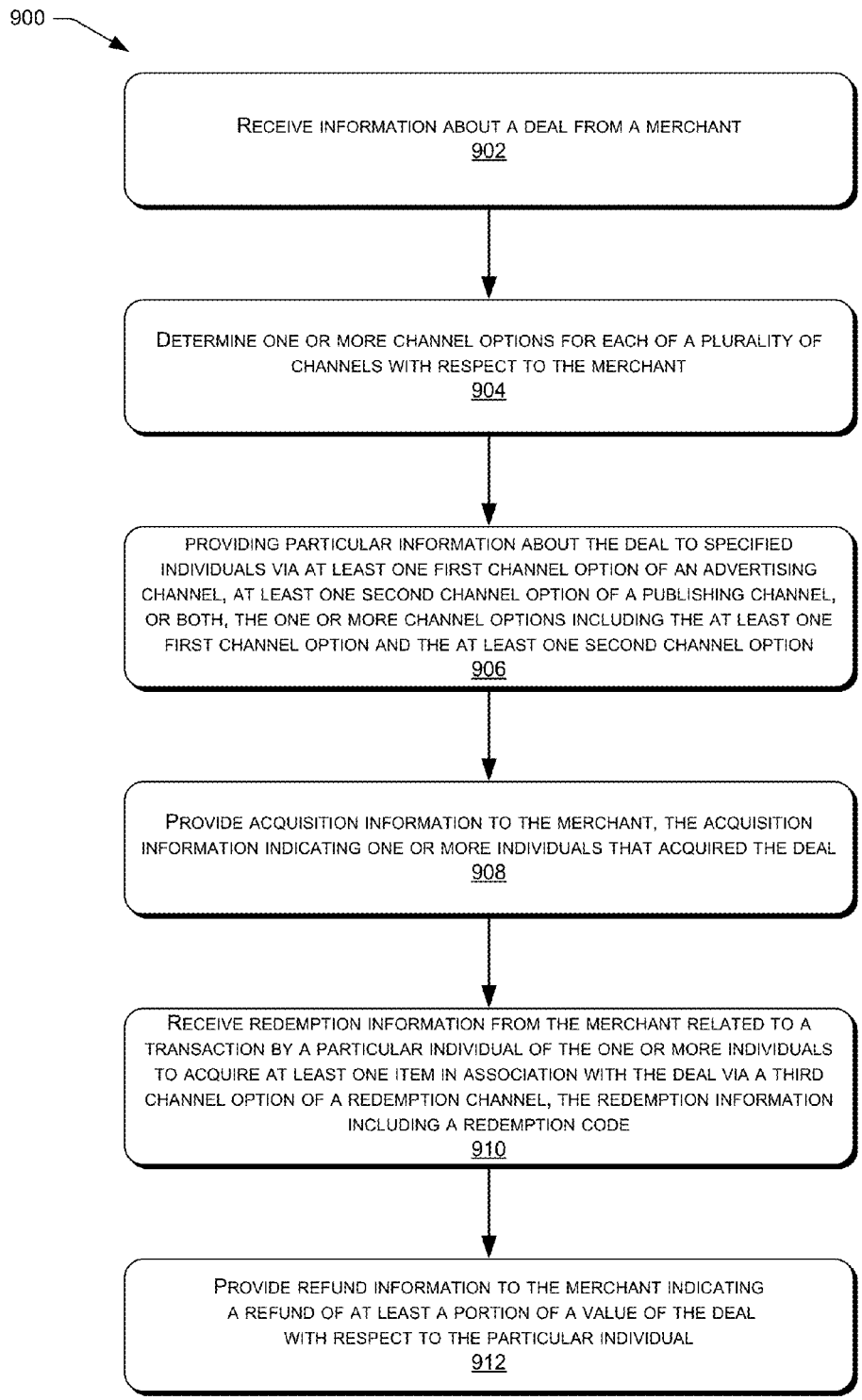
FIG. 9 is a flow diagram of a process to determine a number of channel options with respect to a plurality of channels for a merchant to send and receive deals-based communications.

FIG. 9 is a flow diagram of a process 900 to determine a number of channel options with respect to a plurality of channels for a merchant to send and receive deals-based communications. In some cases, the number of channel options with respect to the plurality of merchants may be determined based at least partly on a request received by a service provider from the merchant to utilize at least one particular channel option with respect to at least one channel of the plurality of channels. At 902, the process 900 includes receiving information about a deal from a merchant and, at 904, the process 900 includes determining one or more channel options with respect to each of a plurality of channels with respect to the merchant. In some cases, the service provider, the merchant, and/or a deal sourcer may provide one or more incentives to individuals to utilize certain channel options to obtain information about deals, to acquire deals, to acquire items in association with deals, or combinations thereof. The one or more channel options determined with respect to the merchant may include at least one first channel option of an advertising channel and at least one second channel option of a publishing channel. Additionally, the channel options determined with respect to one channel may affect the channel options for another channel.

At 906, the process 900 includes providing particular information about the deal to specified individuals via at least one first channel option of an advertising channel, at least one second channel option of a publication channel, or both. In addition, at 908, the process 900 includes providing acquisition information to the merchant, where the acquisition information indicates one or more individuals that acquired the deal. Further, at 910, the process 900 includes receiving redemption information from the merchant related to a transaction by a particular individual of the one or more individuals to acquire at least one item in association with the deal via a third channel option of a redemption channel. The redemption information may include a respective redemption code provided to the individual upon acquisition of the deal by the individual. In some cases, the service provider may receive redemption information from different individuals via different channel options with respect to the redemption channel.

At 912, the process 900 includes providing refund information to the merchant indicating a refund of at least a portion of a value of the deal with respect to the individual. In some cases, the service provider may receive a request from the particular individual to refund a value provided by the particular individual to acquire the deal. In other scenarios, the service provider may receive from the merchant an indication of a transaction to return at least one item of the one or more items acquired by the particular individual in association with the deal. In particular implementations, the service provider may modify a value of the deal at least partly in response to receiving the indication of the transaction to return at least one item of the one or more items acquired by the particular individual in association with the deal.

Figure 10:
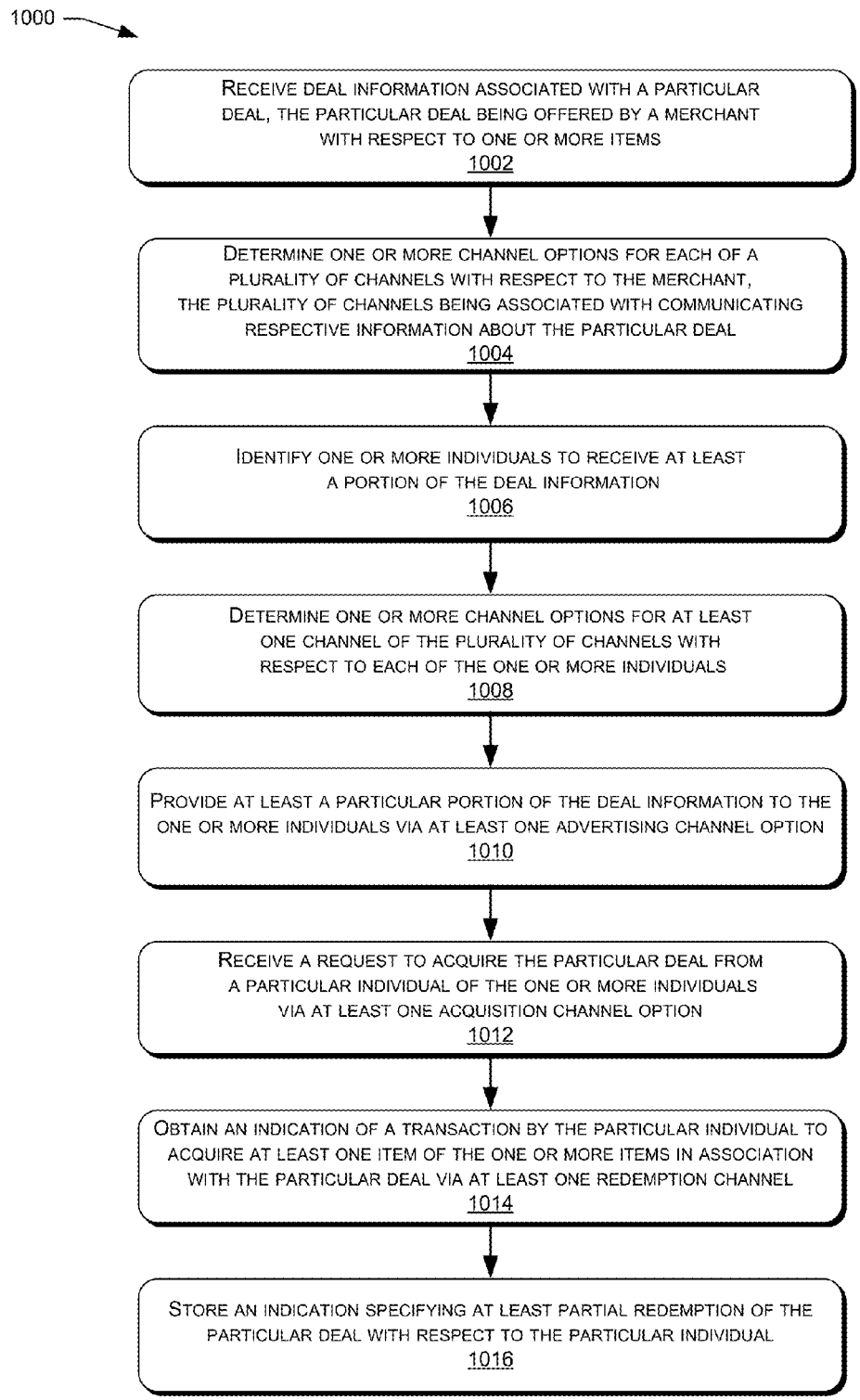
FIG. 10 is a flow diagram of a process to exchange deals-based communications between a service provider, a merchant, and a number of individuals.

FIG. 10 is a flow diagram of a process 1000 to exchange deals-based communications between a service provider, a merchant, and a number of individuals. At 1002, the process 1000 includes a service provider receiving deal information associated with a particular deal that may be offered by a merchant with respect to one or more items. The deal information may be received from the merchant, a deal sourcer, or both At 1004, the process 1000 includes determining one or more channel options for each of a plurality of channels with respect to the merchant. The plurality of channels may be associated with communicating respective information about the particular deal. The one or more channel options for each of the plurality of channels with respect to the merchant may be determined based, at least in part, on performance of previous deals of the merchant, ratings of the merchant, reviews of the merchant, payment arrangements between the merchant and the service provider, terms of the particular deal, the one or more items offered in association with the particular deal, category of computing devices of the merchant, one or more services acquired by the merchant from the service provider, preferences of the merchant, number of deals previously offered by the merchant via the service provider, number of deals offered by the merchant via the service provider with respect to one or more channels of the plurality of channels, or combinations thereof.

At 1006, the process 1000 includes identifying one or more individuals to receive at least a portion of the deal information and, at 1008, the process 1000 includes the service provider determining one or more channel options for at least one channel of the plurality of channels with respect to each of the one or more individuals. In certain situations, the service provider may determine a first channel option for a particular channel of the plurality of channels with respect to a first individual and determine a second channel option for the particular channel of the plurality of channels with respect to a second individual. The second channel option may be different from the first channel option. The service provider may determine the one or more channel options for the at least one channel of the plurality of channels with respect to each of the one or more individuals is based, at least in part, on deal acquisition history of the one or more individuals, item acquisition history of the one or more individuals, preferences of the one or more individuals, item search/browse history of the one or more individuals, deal browse/search history of the one or more individuals, transaction information for acquisitions by the one or more individuals, location of the one or more individuals, computing device usage history of the one or more individuals, computing device currently being utilized by the one or more individuals, category of computing devices of the one or more individuals, operating system executing on computing devices of the one or more individuals, channel option usage history for the one or more individuals, a time period for acquisition of the particular deal, recent activity on computing devices of the one or more individuals, or combinations thereof.

In some instances the plurality of channel options with respect to the merchant and/or the one or more individuals may include one or more categories of computing devices, one or more operating systems, a site of the merchant, a site of the service provider, a deals site, an online retail site, email, messages, video calls, voice calls, interactive voice response (IVR) calls, one or more social networking sites, one or more micro-blogging sites, one or more content sharing sites, one or more client device applications, one or more web-based applications, one or more application programming interfaces (APIs), or combinations thereof. Additionally, at least one channel option of the advertising channel, at least one channel option of the acquisition channel, at least one channel option of the redemption channel, or combinations thereof, may be selected from the one or more channel options for each of the plurality of channels with respect to the merchant, the one or more channel options for the at least one channel of the plurality of channels with respect to each of the one or more individuals, or both.

At 1010, the process includes providing at least a particular portion of the deal information to the one or more individuals via at least one advertising channel option. In certain cases, the particular portion of the deal information may be provided to the one or more individuals via at least one publishing channel option. At 1012, the process 1000 includes receiving a request to acquire the particular deal from a particular individual of the one or more individuals via at least one acquisition channel option.

At 1014, the process 1000 includes obtaining an indication of a transaction by the particular individual to acquire at least one item of the one or more items in association with the particular deal via at least one redemption channel. The indication of the transaction by the particular individual to acquire the at least one item of the one or more items in association with the particular deal may be obtained by the service provider from the merchant, a mobile payments services provider, a financial institution, the particular individual, or combinations thereof. In addition, at 1016, the process 1000 includes store an indication specifying at least partial redemption of the particular deal with respect to the particular individual. In some cases, the indication specifying at least partial redemption of the particular deal with respect to the individual is received, at least in part, in response to receiving the indication of the transaction by the particular individual to acquire the at least one item of the one or more items in association with the particular deal.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving, by one or more service provider servers that each include a processor and memory, deal information associated with a deal being offered by a merchant with respect to one or more items;
storing, by at least one of the one or more service provider servers, information of the merchant indicating at least one of a number of acquisitions of previous deals offered by the merchant, a rating of the merchant, or a number of redemptions of the previous deals offered by the merchant;
determining, by at least one of the one or more service provider servers, one or more first channel options for a plurality of channels with respect to the merchant based at least partly on the information of the merchant satisfying a threshold criteria, the plurality of channels including an advertising channel associated with communicating at least a portion of the deal information to individuals and an acquisition channel associated with communicating information about transactions to acquire the deal;

identifying, by at least one of the one or more service provider servers, one or more individuals to receive the at least the portion of the deal information;

determining, by at least one of the one or more service provider servers, one or more second channel options for at least one channel of the plurality of channels with respect to the one or more individuals based at least in part on an amount of usage of channel options of the plurality of channels by the one or more individuals satisfying one or more additional threshold criteria;

providing, by at least one of the one or more service provider servers, the at least the portion of the deal information to the one or more individuals via at least one channel option for the advertising channel, the at least one channel option for the advertising channel being included in the one or more first channel options and the one or more second channel options;

receiving, by at least one of the one or more service provider servers, a request to acquire the deal from an individual of the one or more individuals via at least one additional channel option for the acquisition channel;

obtaining, by at least one of the one or more service provider servers, an indication of a transaction by the individual to acquire at least one item of the one or more items in association with the deal via a channel option for a redemption channel of the plurality of channels; and storing, by at least one of the one or more service provider servers, an indication specifying at least partial redemption of the deal with respect to the individual.

2. The computer-implemented method as recited in claim 1, wherein the deal information is received from the merchant, a deal sourcer, or both.

3. The computer-implemented method as recited in claim 1, further comprising providing, by at least one of the one or more service provider servers, the at least the portion of the deal information to the one or more individuals via a channel option for a publishing channel of the plurality of channels.

4. The computer-implemented method as recited in claim 1, wherein the indication of the transaction by the individual to acquire the at least one item in association with the deal is obtained from the merchant, a mobile payments services provider, a financial institution, the individual, or combinations thereof.

5. The computer-implemented method as recited in claim 1, wherein the one or more channel options include one or more categories of computing devices, one or more operating systems, a site of the merchant, a site of the service provider, a deals site, an online retail site, email, messages, video calls, voice calls, interactive voice response (IVR) calls, one or more social networking sites, one or more micro-blogging sites, one or more content sharing sites, one or more client device applications, one or more web-based applications, one or more application programming interfaces (APIs), or combinations thereof.

6. The computer-implemented method as recited in claim 1, wherein the determining the one or more channel options for the plurality of channels with respect to the merchant is based, at least in part, on performance of previous deals of the merchant, ratings of the merchant, reviews of the merchant, payment arrangements between the merchant and the service provider, terms of the deal, the one or more items offered in association with the deal, category of computing devices of the merchant, one or more services acquired by the merchant from the service provider, preferences of the merchant, number of deals previously offered by the merchant via the service provider, number of deals offered by the merchant via the service provider with respect to one or more channels of the plurality of channels, or combinations thereof.

7. The computer-implemented method as recited in claim 1, wherein the determining the one or more channel options for the at least one channel with respect to the one or more individuals is based, at least in part, on deal acquisition history of the one or more individuals, item acquisition history of the one or more individuals, preferences of the one or more individuals, item search/browse history of the one or more individuals, deal browse/search history of the one or more individuals, transaction information for acquisitions by the one or more individuals, location of the one or more individuals, computing device usage history of the one or more individuals, computing device currently being utilized by the one or more individuals, category of computing devices of the one or more individuals, operating system executing on computing devices of the one or more individuals, a time period for acquisition of the deal, recent activity on computing devices of the one or more individuals, or combinations thereof.

8. The computer-implemented method as recited in claim 1, wherein:
the determining, by at least one of the one or more service provider servers, the one or more first channel options for the plurality of channels with respect to the merchant includes determining that a discount of the deal is above a threshold discount; and
the determining, by at least one of the one or more service provider servers, the one or more second channel options for the at least one channel of the plurality of channels with respect to the one or more individuals includes determining that the one or more individuals have acquired at least a specified number of deals from the service provider.

9. The computer-implemented method as recited in claim 1, wherein the determining the one or more channel options for the at least one channel of the plurality of channels with respect to the one or more individuals includes:
determining a channel option for a channel of the plurality of channels with respect to a first individual; and
determining an additional channel option for the channel with respect to a second individual, the additional channel option for the channel being different from the channel option for the channel.

10. The computer-implemented method as recited in claim 1, further comprising providing one or more incentives for at least a portion of the one or more individuals to utilize a specified channel option with respect to sending information, receiving information, or both, in association with the deal.

11. A server comprising:
a processor; and
memory accessible by the processor, the memory storing one or more modules executable by the processor to perform operations comprising:
determining one or more channel options with respect to an individual for a deal based at least partly on an amount of usage of channel options of a plurality of channels by the individual satisfying one or more threshold criteria, at least a portion of the one or more channel options being configured to exchange communications via an advertising channel, a publishing channel, an acquisition channel, a redemption channel, or combinations thereof;

providing information about the deal to the individual via a first channel option associated with the advertising channel;

obtaining deal acquisition information via a second channel option associated with the acquisition channel, the deal acquisition information being related to a transaction for the individual to acquire the deal; and receiving redemption information via a third channel option associated with the redemption channel, the redemption information being related to acquisition by the individual of one or more items in association with the deal.

12. The server as recited in claim 11, wherein the operations further comprise determining one or more additional channel options with respect to the individual for an additional deal, at least one additional channel option of the one or more additional channel options being different from a channel option of the one or more channel options.

13. The server as recited in claim 11, wherein the operations further comprise receiving a request from the individual to refund a value provided by the individual to acquire the deal.

14. The server as recited in claim 11, wherein the operations further comprise receiving an indication of a transaction to return at least one item of the one or more items acquired by the individual in association with the deal.

15. The server as recited in claim 14, wherein the operations further comprise modifying a value of the deal at least partly in response to receiving the indication of the transaction to return at least one item of the one or more items acquired by the individual in association with the deal.

16. The server as recited in claim 11, wherein the operations further comprise providing at least a portion of the information about the deal and an input option to acquire the deal to the individual via a fourth channel option associated with the publishing channel.

17. The server as recited in claim 16, wherein the first channel option, the second channel option, the third channel option, the fourth channel option, or combinations thereof, are different from each other.

18. A non-transitory computer-readable storage media storing computer-readable instructions that, when executed, instruct a processor to perform operations comprising:

receiving deal information about a deal offered by a merchant with respect to one or more items;

storing information of the merchant indicating at least one of a number of acquisitions of previous deals offered by the merchant, a rating of the merchant, or a number of redemptions of the previous deals offered by the merchant;

determining one or more channel options for individual ones of a plurality of channels based at least partly on the information of the merchant satisfying a threshold criteria, the plurality of channels being associated with communicating information related to the deal;

providing at least a portion of the deal information via at least a first channel option of the one or more channel options for a first channel of the plurality of channels; and receiving additional information with respect to the deal via at least a second channel option of the one or more of channel options for a second channel of the plurality of channels, the second channel option being a different form of electronic communication than the first channel option.

19. The non-transitory computer-readable storage media as recited in claim 18, wherein the additional information is associated with acquisition of the deal.

20. The non-transitory computer-readable storage media as recited in claim 18, wherein a channel option of an advertising channel includes a video call.

21. The non-transitory computer-readable storage media as recited in claim 20, wherein the operations further comprise:

determining that an individual participating in the video call is included in a first target audience for one or more first deals;

causing the one or more first deals to be displayed to the individual, the one or more first deals being available for acquisition by the individual;

determining that an additional individual participating in the video call is included in a second target audience for one or more second deals; and causing the one or more second deals to be displayed to the individual participating in the video call, the one or more second deals being available for acquisition by the individual for the additional individual.

22. The non-transitory computer-readable storage media as recited in claim 18, wherein a channel option of the one or more channel options includes a content sharing site, the content sharing site providing access to text content, image content, video content, audio content, or combinations thereof, provided to the content sharing site by a number of individuals.

23. The non-transitory computer-readable storage media as recited in claim 22, wherein the operations further comprise providing the-at least the portion of the deal information to the content sharing site, the at least the portion of the deal information to be displayed in response to content of the content sharing site that is associated with at least one item of the one or more items being accessed by one or more individuals.

24. The non-transitory computer-readable storage media as recited in claim 22, wherein the operations further comprise:

receiving an indication that an individual has shared content associated with at least one item of the one or more items with one or more additional individuals; and providing value to the individual at least partly in response to receiving the indication that the individual has shared content associated with the at least one item of the one or more items with the one or more additional individuals.

25. The non-transitory computer-readable storage media as recited in claim 18, wherein the one or more channel options are determined for at least one channel of the plurality of channels based, at least in part, on terms of the deal, traffic associated with each of the one or more channel options, preferences of a service provider offering the deal on behalf of the merchant, acquisitions of the deal, or combinations thereof.

26. A computer-implemented method, comprising:

receiving, by one or more service provider servers that each include a processor and memory, information about a deal from a merchant;

storing, by at least one of the one or more service provider servers, information of the merchant indicating at least one of a number of acquisitions of previous deals offered by the merchant, a rating of the merchant, or a number of redemptions of the previous deals offered by the merchant;

determining, by at least one of the one or more service provider servers, one or more channel options for individual ones of a plurality of channels with respect to the merchant based at least partly on the information of the merchant satisfying one or more threshold criteria;

providing, by at least one of the one or more service provider servers, at least a portion of the information about the deal to individuals via at least one first channel option of an advertising channel, at least one second channel option of a publishing channel, or both, the one or more channel options including the at least one first channel option and the at least one second channel option;

providing, by at least one of the one or more service provider servers, acquisition information to the merchant, the acquisition information indicating one or more individuals that acquired the deal; and receiving, by at least one of the one or more service provider servers, redemption information from the merchant related to a transaction by an individual of the one or more individuals to acquire at least one item in association with the deal via a third channel option of a redemption channel, the redemption information including a redemption code.

27. The computer-implemented method as recited in claim 26, further comprising receiving a request from an additional individual to acquire an item in association with the deal via a fourth channel option of the redemption channel, the fourth channel option being different from the third channel option.

28. The computer-implemented method as recited in claim 26, further comprising receiving a request from the merchant to utilize at least one channel option with respect to at least one channel of the plurality of channels.

29. The computer-implemented method as recited in claim 26, wherein a channel option with respect to an acquisition channel, an additional channel option with respect to the redemption channel, or both, are utilized based, at least in part, on the first channel option of the advertising channel, the second channel option of the publishing channel, or both.

30. The computer-implemented method as recited in claim 26, further comprising providing one or more incentives to individuals to utilize at least one channel option to obtain information about deals, to acquire deals, to acquire items in association with deals, or combinations thereof.

* * * * *